United States Patent
Li et al.

(10) Patent No.: US 11,874,821 B2
(45) Date of Patent: Jan. 16, 2024

(54) BLOCK AGGREGATION FOR SHARED STREAMS

(71) Applicant: eBay Inc., San Jose, CA (US)

(72) Inventors: Jun Li, Mountain View, CA (US); Mohammad Roohitavaf, San Jose, CA (US); Xinglang Wang, Shanghai (CN)

(73) Assignee: EBAY INC., San Jose, CA (US)

( * ) Notice: Subject to any disclaimer, the term of this patent is extended or adjusted under 35 U.S.C. 154(b) by 75 days.

(21) Appl. No.: 17/559,783

(22) Filed: Dec. 22, 2021

(65) Prior Publication Data
US 2023/0195714 A1    Jun. 22, 2023

(51) Int. Cl.
| G06F 16/23   | (2019.01) |
| G06F 16/215  | (2019.01) |
| G06F 16/2455 | (2019.01) |
| G06F 16/25   | (2019.01) |

(52) U.S. Cl.
CPC ................. *G06F 16/2365* (2019.01)

(58) Field of Classification Search
CPC .. G06F 16/2365; G06F 11/0793; G06F 11/34; G06F 11/3409; G06F 11/3428; G06F 21/554; G06F 2201/87; G06F 16/244; G06F 16/24568; G06F 3/0619; G06F 16/215; H04L 51/234; H04L 63/1425; H04L 41/142; H04L 41/16; H04L 43/04; H04L 43/08; H04L 43/0823; H04L 43/0852; H04L 43/106; H04L 43/16; H04L 43/50; H04L 51/23; G06N 20/00

See application file for complete search history.

(56) References Cited

U.S. PATENT DOCUMENTS

| 7,103,811 B2 | 9/2006  | Talagala et al. |
| 8,176,269 B2 | 5/2012  | Jaquette et al. |
| 9,817,710 B2 | 11/2017 | Gupta et al.    |
| 9,841,898 B2 | 12/2017 | Patterson et al.|

(Continued)

OTHER PUBLICATIONS

Y. Du, J. Liu, F. Liu and L. Chen, "A Real-Time Anomalies Detection System Based on Streaming Technology," 2014 Sixth International Conference on Intelligent Human-Machine Systems and Cybernetics, Hangzhou, China, 2014, pp. 275-279, doi: 10.1109/IHMSC.2014.168. (Year: 2014).*

(Continued)

*Primary Examiner* — Dennis Truong
(74) *Attorney, Agent, or Firm* — SCHWEGMAN LUNDERG & WOESSNER, P.A.

(57) ABSTRACT

The approaches presented herein may include loading a plurality of metadata instances for a plurality of data blocks stored in a database, each metadata instance of the plurality of metadata instances indicating a respective data block structure applied to aggregate a set of data messages. The approaches may include processing a first metadata instance corresponding to a first set of one or more data blocks of the plurality of data blocks and a second metadata instance corresponding to a second set of one or more data blocks of the plurality of data blocks to perform an anomaly storage check between the first set of one or more data blocks of the plurality of data blocks and the second set of one or more data blocks of the plurality of data blocks. The approaches may include generating an output based at least in part on the anomaly storage check.

20 Claims, 15 Drawing Sheets

(56) References Cited

U.S. PATENT DOCUMENTS

| | | | |
|---|---|---|---|
| 9,946,593 B2* | 4/2018 | Bishop | G06F 11/1471 |
| 10,298,259 B1 | 5/2019 | Lazier | |
| 10,503,703 B1 | 12/2019 | Konduru et al. | |
| 11,075,984 B1* | 7/2021 | Mercier | H04L 43/20 |
| 2004/0181734 A1 | 9/2004 | Saliba | |
| 2009/0240678 A1 | 9/2009 | Sadovsky et al. | |
| 2012/0150826 A1 | 6/2012 | Retnamma et al. | |
| 2015/0379430 A1* | 12/2015 | Dirac | G06N 20/00 706/12 |
| 2016/0179588 A1 | 6/2016 | Raman et al. | |
| 2017/0310628 A1* | 10/2017 | Norwood | H04L 12/1859 |
| 2018/0267896 A1 | 9/2018 | Zhang et al. | |
| 2019/0028501 A1* | 1/2019 | Choudhary | H04L 41/142 |
| 2019/0149504 A1* | 5/2019 | Norwood | H04L 43/045 709/206 |
| 2019/0171516 A1* | 6/2019 | Parra | G06F 11/3428 |
| 2019/0230112 A1* | 7/2019 | Gandham | H04L 41/0886 |
| 2020/0092082 A1 | 3/2020 | Raman et al. | |
| 2020/0192871 A1 | 6/2020 | Hirsch et al. | |
| 2020/0210394 A1 | 7/2020 | Agrawal et al. | |
| 2021/0029002 A1* | 1/2021 | Mordani | H04L 43/022 |
| 2021/0034248 A1 | 2/2021 | Faibish et al. | |
| 2021/0271551 A1 | 9/2021 | Akutsu et al. | |

OTHER PUBLICATIONS

L. Rettig, M. Khayati, P. Cudré-Mauroux and M. Piórkowski, "Online anomaly detection over Big Data streams," 2015 IEEE International Conference on Big Data (Big Data), Santa Clara, CA, USA, 2015, pp. 1113-1122, doi: 10.1109/BigData.2015.7363865. (Year: 2015).*

Clickhouse Kafka Consumer—Exactly once Semantic, ClickHouse GitHub, Retrieved from the Internet URL :<https://github.com/ClickHouse/ClickHouse/issues/20285>, Accessed on Sep. 16, 2021, 2 pages.

Filimonov, "ClickHouse Kafka Engine FAQ", Retrieved from the Internet URL :<https://altinity.com/blog/clickhouse-kafka-engine-faq> May 4, 2020, 14 pages.

Data Replication, ClickHouse Documentation, Retrieved from the Internet URL :<https://clickhouse.tech/docs/en/engines/table-engines/mergetree-family/replication/> Accessed on Mar. 2, 2022, 11 pages.

Kafka, ClickHouse Documentation, Retrieved from the Internet URL : <https://clickhouse.tech/docs/en/engines/table-engines/integrations/kafka/>, Accessed on Sep. 15, 2021, 4 pages.

Overview of ClickHouse Architecture, ClickHouse Documentation, Retrieved from the Internet URL :<https://clickhouse.tech/docs/en/development/architecture/> Accessed on Mar. 2, 2022, 13 pages.

Github, "Clickhouse_Sinker", Easily Load Data from kafka to ClickHouse, Retrieved from the Internet URL :<https:// github.com/housepower/clickhouse_sinker>, Accessed on Sep. 21, 2021, 2 pages.

LAX, "After Lambda: Exactly-once processing in Google Cloud Dataflow, Part 1", Retrieved from the Internet URL : <https://cloud.google.com/blog/products/data-analytics/after-lambda-exactly-once-processing-in-google-cloud-dataflow-part-1>, May 10, 2017, 7 pages.

Narkhede, "Exactly-Once Semantics Are Possible: Here's How Kafka Does It", Apache Kafka, Confluent, Retrieved from the Internet URL :<https://www.confluent.io/blog/exactly-once-semantics-are-possible-heres-how-apache-kafka-does-it/>, Jun. 30, 2017, 12 pages.

Sahay et al., "A Study on Developing Resilient Big Data Stream Processing Applications using Apache Kafka", International Journal of Scientific Research and Engineering Development—vol. 4, Issue 3, Retrieved from the Internet URL :<http://www.ijsred.com/volume4/issue3/IJSRED-V4I3P197.pdf>, May-Jun. 2021, pp. 1433-1440.

* cited by examiner

BLOCK AGGREGATION FOR SHARED STREAMS

FIELD OF TECHNOLOGY

The present disclosure relates generally to database systems and data processing, and more specifically to block aggregation for shared streams.

BACKGROUND

Real time analytics or other data processing tasks may often generate or work with large amounts of data that are stored for analysis or retrieval. Such data may be stored in a database to facilitate various uses of the data. However, errors anywhere along the data storage process may cause a loss of data. Some methods of data recovery (e.g., blind attempts at recreating the data) may themselves lead to data loss or data duplication and may provide inferior results.

SUMMARY

A method for data processing is described. The method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generating an output based at least in part on the anomaly storage check.

An apparatus for data processing is described. The apparatus may include a processor, memory coupled with the processor, and instructions stored in the memory. The instructions may be executable by the processor to cause the apparatus to loading, by at least one processor, a plurality of metadata instances for a plurality of data blocks store in a database, each metadata instance of the plurality of metadata instances indicating a respective data block structure applied to aggregate a set of data messages by a respective data block of the plurality of data blocks, process a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generate an output based at least in part on the anomaly storage check.

Another apparatus for data processing is described. The apparatus may include means for loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and means for generating an output based at least in part on the anomaly storage check.

A non-transitory computer-readable medium storing code for data processing is described. The code may include instructions executable by a processor to loading, by at least one processor, a plurality of metadata instances for a plurality of data blocks store in a database, each metadata instance of the plurality of metadata instances indicating a respective data block structure applied to aggregate a set of data messages by a respective data block of the plurality of data blocks, process a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generate an output based at least in part on the anomaly storage check.

In some examples of the method, apparatuses, and non-transitory computer-readable medium described herein, the processing may include operations, features, means, or instructions for detecting a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks.

In some examples of the method, apparatuses, and non-transitory computer-readable medium described herein, the processing may include operations, features, means, or instructions for detecting an overlap anomaly based at least in part on the first metadata instance and the second metadata instance indicating that a range of data messages aggregated in the first set of one or more data blocks at least partially overlaps with a range of data messages aggregated in the second set of one or more data blocks.

In some examples of the method, apparatuses, and non-transitory computer-readable medium described herein, generating the output may include operations, features, means, or instructions for transmitting a message that indicates an anomaly may be detected or may be not detected.

In some examples of the method, apparatuses, and non-transitory computer-readable medium described herein, each of the first set of one or more data blocks and the second set of one or more data blocks corresponds to a same table stored in the database.

Some examples of the method, apparatuses, and non-transitory computer-readable medium described herein may further include operations, features, means, or instructions for receiving, from a data processing pipeline, a first plurality of messages to be stored in the database, storing the first metadata instance indicating a first data block structure applied to aggregate the first plurality of messages into the first set of one or more data blocks, each data block of the first set of one or more data blocks being associated with a respective table of a plurality of tables stored in the database, aggregating, by an aggregator, the first plurality of messages into the first set of one or more data blocks in accordance with the first data block structure, and loading, in the database, the first set of one or more data blocks in the plurality of tables.

Some examples of the method, apparatuses, and non-transitory computer-readable medium described herein may further include operations, features, means, or instructions for detecting a processing failure event corresponding to the data processing pipeline, the aggregator, the database, or any combination thereof, retrieving a third metadata instance indicating a second data block structure and a second plurality of messages indicated by the second metadata instance, aggregating the second plurality of messages into a second plurality of data blocks in accordance with the second data block structure, and loading, in the database, the second plurality of data blocks in the plurality of tables.

Some examples of the method, apparatuses, and non-transitory computer-readable medium described herein may further include operations, features, means, or instructions for detecting a processing failure event corresponding to the data processing pipeline, the aggregator, the database, or any combination thereof, retrieving a third metadata instance indicating a second data block structure and a second plurality of messages indicated by the second metadata instance, and determining that a second plurality of data blocks was previously stored by the database in the plurality of tables based at least in part on the third metadata instance.

Some examples of the method, apparatuses, and non-transitory computer-readable medium described herein may further include operations, features, means, or instructions for storing the plurality of metadata instances in memory separate from the database prior to loading the first set of one or more data blocks in the database.

In some examples of the method, apparatuses, and non-transitory computer-readable medium described herein, the first metadata instance indicates a first data block structure identifying a minimum message offset and a maximum message offset for a plurality of messages aggregated in the first set of one or more data blocks corresponding to a first table of the database.

In some examples of the method, apparatuses, and non-transitory computer-readable medium described herein, the first metadata instance indicates a first data block structure identifying a minimum message offset and a maximum message offset for a plurality of messages aggregated in the first set of one or more data blocks corresponding to multiple tables of the database.

DETAILED DESCRIPTION

Figure 1:
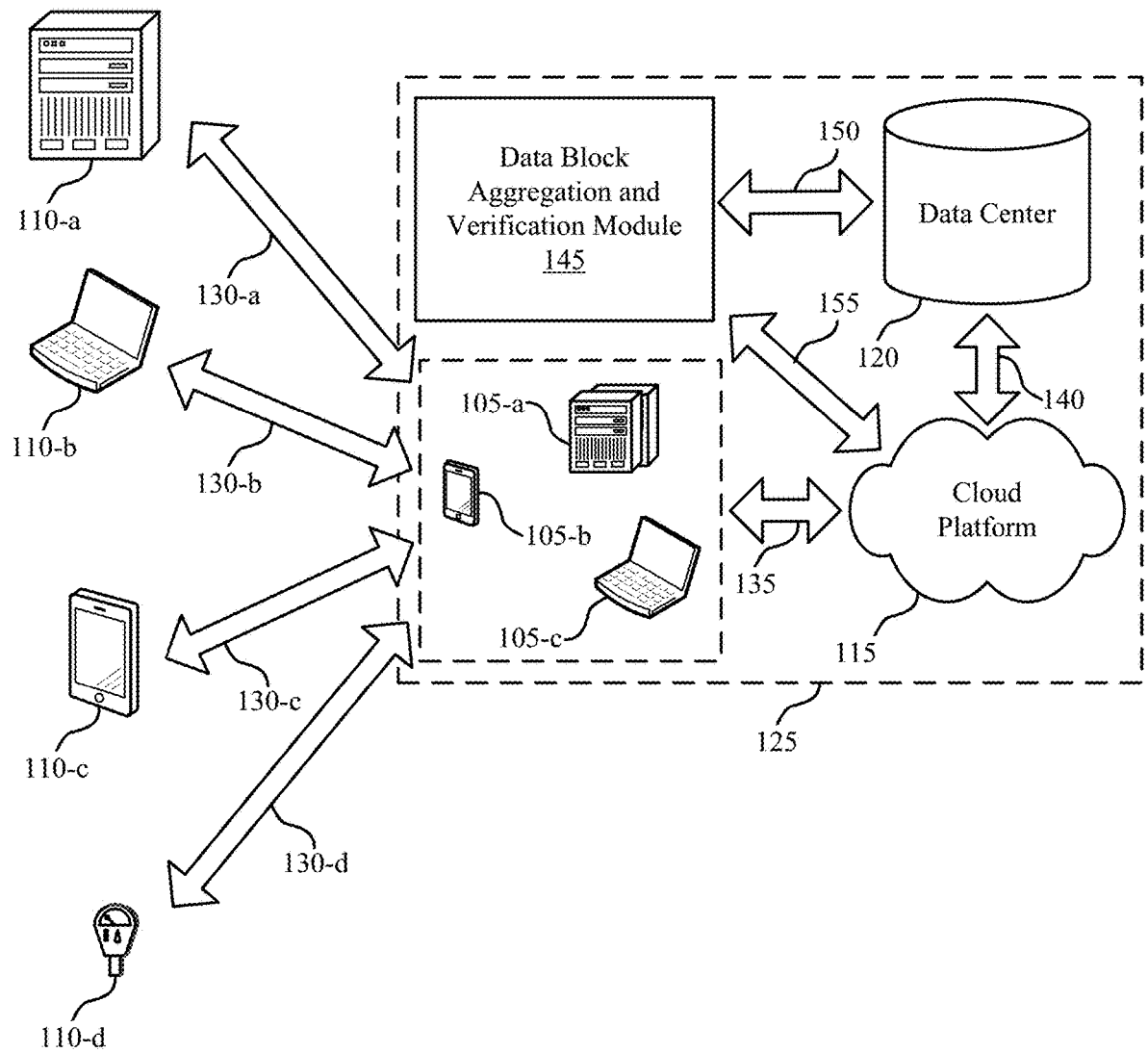
FIG. 1 illustrates an example of a data processing system that supports block aggregation for shared streams in accordance with examples as disclosed herein.

Real time analytics or other data processing tasks may often generate or work with large amounts of data that is stored for analysis or retrieval. The management and storage of such data is critical to the operation of many systems. In some examples, a system may employ a data processing pipeline (e.g., Kafka) to manage and move around these large amounts of data. Such data may be stored in a database to facilitate various uses of the data, including analysis, retrieval for client use, or for other purposes. However, errors anywhere along the data storage process (e.g., from the initial reception of the data, processing in a processing pipeline, data block aggregators, network connections anywhere along this flow, or at other elements) may cause a loss of data, duplication of stored data, or both. Some methods of data recovery (e.g., blind attempts at recreating the data) may themselves lead to data loss or data duplication and may not be capable of producing exact reconstructions of lost data in an efficient manner, if at all, since no metadata about the data structure or selection of data is stored in conventional systems.

To reduce or eliminate such data loss, data duplication, or both, the subject matter herein describes a novel data structure system that creates and stores metadata indicating the data structure data blocks being created from a stream of data messages before storing the data blocks in a backend database. The metadata may be used to recreate the data blocks should a failure occur in the data processing pipeline, the aggregator, or the database, to avoid data loss as well as data duplication.

For example, a system implementing the subject matter may receive a stream of data messages (e.g., from a data processing pipeline). Such data messages may be categorized into topics for storage by the database in one or more tables. A data aggregator may aggregate the messages into blocks that are to be stored in a database (e.g., messages are grouped into blocks for storage in one or more tables associated with a same topic), and may store metadata about the structure of the blocks of data messages being created for storage in the database. The aggregator may receive a set of data messages associated with a same topic, where each data message is to be stored by the database in one or more tables. The aggregator may note which messages of the stream of data messages (e.g., a range of messages) are to be included in which table and in which data block. Further, the aggregator may also note which set of messages from the stream of data messages (e.g., a range of data messages) are included in a set of data blocks collectively. In this way, the exact structure of the data blocks is known and may be recreated exactly. Such information may then be included in the metadata and the metadata may be stored separately from the data blocks (e.g., in memory separate from the database). In this way, the metadata may allow creation or recovery of exact reproductions of lost data blocks and may avoid duplicate storage of data blocks by the database.

The metadata may be stored in a memory separate from the database before the data blocks are stored in the database to enable reconstruction of lost data blocks due to a failure in the system before successful storage in the database. Further, the metadata may include local (e.g., number of messages included per table in a respective block) or global (e.g., number of messages included per multiple tables stored in a set of data blocks) maxima and minima, or both, to define the bounds of individual messages stored by data blocks in respective tables of the database.

The metadata may be used for verifying that the data blocks are not missing data or do not include duplicate data blocks. For instance, the metadata may indicate a data block structure that was applied to incoming data messages in order to form the data blocks in the first place. A verification system may load one or more instances of metadata that may describe the data structure of one or more data blocks loaded in the database, and may process these instances of metadata to perform one or more verification processes (e.g., anomaly detection) to ensure that the initial aggregation and storage were performed correctly. For example, a verification system may detect anomalies in the metadata indicating gaps or overlaps in the data stored in one or more blocks. If there is a gap or overlap, this may indicate that the initial storage process (e.g., data collection, aggregation, metadata creation, and storage of the aggregated data) was not performed properly. A verification system may then transmit an indication or message notifying of such a result so that corrective action may be taken.

Aspects of the disclosure are initially described in the context of an environment supporting an on-demand database service. Aspects of the disclosure are then illustrated by and described with reference to a system diagram, process flows, and examples of data storage anomalies. Aspects of the disclosure are further illustrated by and described with reference to apparatus diagrams, system diagrams, and flowcharts that relate to block aggregation for shared streams.

FIG. 1 illustrates an example of a system 100 for cloud computing that supports block aggregation for shared streams in accordance with various aspects of the present disclosure. The system 100 includes cloud clients 105, client devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple client devices 110. The interactions 130 may include communications, opportunities, purchases, sales, or any other interaction between a cloud client 105 and a client device 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Client devices 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A client device 110 may also be referred to as a customer, a potential customer, a lead, a client, or some other suitable terminology. In some cases, the client device 110 may be an example of a user device, such as a server (e.g., client device 110-*a*), a laptop (e.g., client device 110-*b*), a smartphone (e.g., client device 110-*c*), or a sensor (e.g., client device 110-*d*). In other cases, the client device 110 may be another computing system. In some cases, the client device 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with client device interactions 130 from the cloud client 105 over network connection 135, and may store and analyze the data. In some cases, cloud platform 115 may receive data directly from an interaction 130 between a client device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a client device 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, data center 120, and data block aggregation and verification module 145. In some cases, data processing may occur at any of the components of subsystem 125, or at a combination of these components. In some cases, servers may perform the data processing. The servers may be a cloud client 105 or located at data center 120.

In some aspects, the system 100 may be configured to use metadata generated when data messages are aggregated in data blocks for verifying whether the metadata indicates one or more anomalies. According to techniques described herein, the system 100 may include data block aggregation and verification module 145 which is configured to use metadata generated when data messages are aggregated in data blocks for verifying whether the metadata indicates one or more anomalies. The data block aggregation and verification module 145 may communicate with cloud platform 115 via connection 155 and may also communicate with data center 120 via connection 150. The data block aggregation and verification module 145 may receive signals and inputs from client device 110 via cloud clients 105 and via cloud platform 115 or data center 120. In some aspects, the data block aggregation and verification module 145 may include one or more servers.

For example, the data block aggregation and verification module 145 may load metadata instances for one or more data blocks stored in a database (e.g., at the data center 120, the cloud platform 115, or other storage). These metadata instances may describe a block structure of or be associated with respective data blocks that were aggregated and stored in the database. The data block aggregation and verification module 145 may process the metadata instances to perform an anomaly storage check. An anomaly storage check may compare multiple metadata instances and the block structure of the respective data blocks stored therein to determine whether there are any storage errors or anomalies associated with the data blocks (e.g., backward anomalies, overlap anomalies, gap anomalies, data duplication, or other errors or anomalies). Further, the data block aggregation and verification module 145 may generate one or more outputs based on the anomaly storage check (e.g., that may indicate the presence or absence of one or more errors or anomalies). Such outputs may be transmitted to the cloud platform 115, the cloud clients 105, the client device 110, or other devices or locations.

The data block aggregation and verification module 145 may further receive a stream or a group of messages (e.g., from an external or internal source, such as one or more of the client devices 110, the cloud clients 105, the cloud platform 115, the data center 120, another device or location, or any combination thereof). The data block aggregation and verification module 145 may store a metadata instance that may indicate a block structure (e.g., determined by the data block aggregation and verification module 145) that may be used to aggregate the messages into one or more data blocks. An aggregator (e.g., of the data block aggregation and verification module 145) may aggregate the messages into the one or more data blocks based on the block structure, and the one or more data blocks may be loaded or stored into a database (e.g., at the data center 120, the cloud platform 115, or other storage) for later retrieval or other actions (e.g., the data verification process described herein that identifies anomalies in the data blocks using the stored metadata).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
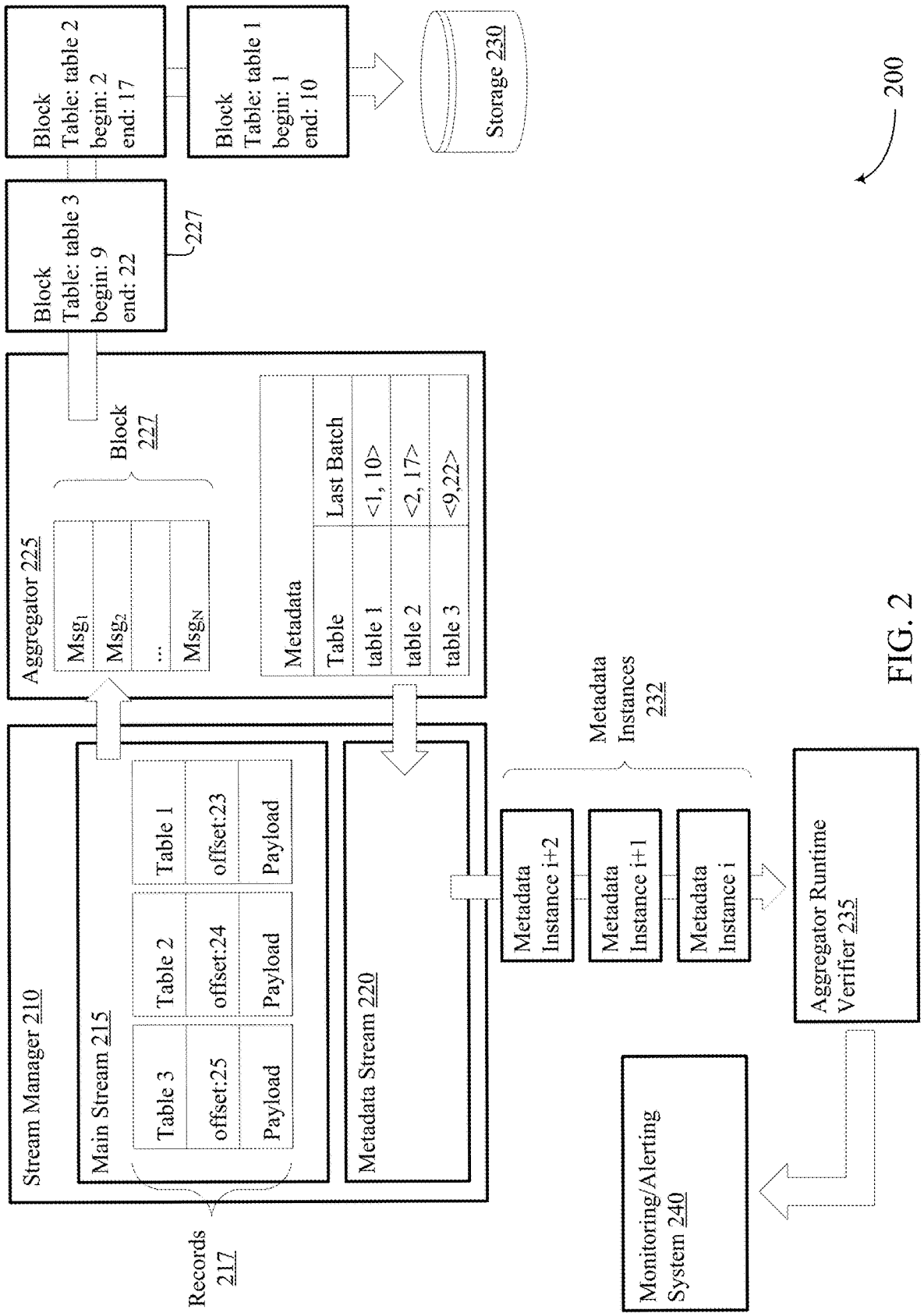
FIG. 2 illustrates an example of a data processing system that supports block aggregation for shared streams in accordance with examples as disclosed herein.

FIG. 2 illustrates an example of a data processing system 200 that supports block aggregation for shared streams in accordance with examples as disclosed herein. The data processing system 200 may include a stream manager 210, which may manage a main stream 215 and a metadata stream 220. The data processing system 200 may further include a aggregator 225 that may create metadata indicating a data block structure specifying the messages aggregated into a particular block 227, and optionally may include additional information about the content of the particular block 227. The components of the data processing system 200 may be implemented in hardware, software, or both. The metadata may be transmitted to a metadata store or other storage (e.g., via the metadata stream 220). The aggregator 225 may aggregate messages received from the main stream 215 into blocks 227 according to the data block structure, and may store the data blocks in the storage 230. For example, the messages may be transmitted or processed by a buffering mechanism (e.g., Kafka). Such messages may then be aggregated into one or more blocks, such as block 227, according to a data block structure for each block. Additionally or alternatively, the messages may be transmitted to the aggregator (e.g., via the main stream 215) directly from a source that generates the messages. Additionally or alternatively, the messages may be generated by data associated with an online marketplace, such as seller data, metrics, statistics, history, or other information associated with the online marketplace.

Messages may be packaged for transmission or processing (e.g., transmission or processing by the main stream 215). For example, the messages may be packaged into a payload of one or more records 217. Each record 217 may identify a table, an offset, and include a payload that includes one or more messages used in accordance with the subject matter disclosed herein.

The aggregator runtime verifier 235 may receive or retrieve the metadata (e.g., from the metadata store or other metadata storage) to verify the data storage scheme. For example, the aggregator runtime verifier 235 may perform one or more anomaly storage checks to verify integrity of the data stored in the data blocks. If one or more anomalies are detected (e.g., as a result or output of an anomaly storage check), the aggregator runtime verifier 235 may transmit a message or indication to the monitoring/alert system 240, which may notify a user, an administrator, and/or another device of the one or more detected anomalies. In this way, the data processing system 200 offers robust data storage and verification of correct storage.

In a real-time data injection pipeline for analytical processing, efficient and fast data loading to a columnar database (e.g., ClickHouse, the storage 230, or other storage) may favor large blocks over individual rows. Therefore, applications may rely on a buffering mechanism (e.g., stream manager 210) to store data temporarily. Such applications may also have a message-processing engine to aggregate messages into large blocks (e.g., according to a data block structure) which may be loaded to a database. The aggregator 225 may be an example of such a message-processing engine. A naive or less effective aggregator may form blocks without additional measures that may cause data duplication or data loss. However, the approaches described herein reduce or eliminate such data duplication or data loss, and further provide for detection of anomalies or errors in such a data storage scheme.

The data processing system 200 may achieve a scalable, highly available and fault-tolerant processing pipeline, and may be deployed in a distributed manner. The storage 230 cluster and the associated stream manager 210 clusters may be deployed in one or more data centers. In some examples, each storage 230 cluster may be sharded, and each shard may include one or more replicas located in multiple data centers. One example may include four replicas across two data centers, where each data center has two replicas, and two stream manager 210 clusters may each be located in a different data center. In such an example, a storage 230 replica may simultaneously consume stream manager 210 messages of a single topic from both stream manager 210 clusters.

A topic may include one or more messages associated with one or more tables in a database (e.g., the storage 230). A message may include one or more rows belonging to the same table. When a new table is added to a backend database (e.g., at the storage 230), there may be no need to make schema changes to the stream manager 210. Further, a number of topics may not increase as additional tables are added. Table rows constructed from stream manager 210 messages from multiple sources (e.g., multiple data centers in a distributed implementation of the data processing system 200) may be merged in database (e.g., at the storage 230).

The aggregator 225 is conceptually located between a stream manager 210 and a storage 230 (e.g., a storage 230 replica). The number of the stream manager 210 partitions for each topic in each stream manager 210 cluster may be configured to be the same as the number of the replicas defined in a storage 230 shard. Stream manager 210 may balance message consumption by assigning partitions to consumers evenly. As a result, under normal situations, one storage 230 replica may be assigned with one partition of the topic from each of two stream manager 210 clusters, as an example.

If one storage 230 replica goes down, the corresponding partition may be picked up or processed by another storage 230 replica in the same shard. For example, in a two-data center storage 230 deployment configuration, the data processing system 200 may tolerate two storage 230 replicas being down at the same time in the entire data center. In another example, with respect to the stream manager 210 clusters deployed in two data centers (as each storage 230 replica may simultaneously consume messages from both stream manager 210 clusters), when one data center goes down, another active stream manager 210 cluster may accept the messages produced from the client application and allow the active storage 230 replicas to consume the messages.

To simplify the topics management in the stream manager 210 cluster, each storage 230 shard may be assigned with a unique topic in each stream manager 210 cluster. One topic contains messages (e.g., rows) that may be associated with multiple tables defined in storage 230. With this deployment model, when a user-defined table gets added to storage 230, it is not necessary to make changes to stream manager 210 clusters that may include hundreds of topics. Furthermore, as a storage 230 cluster often has multiple tables, the number of the topics may not grow as the tables continue to be added to the cluster.

If the stream manager 210 messages are consumed from the two stream manager 210 clusters (e.g., via multiple main streams 215), such messages may be associated with the same table when the corresponding blocks get inserted. Further, some or all messages (e.g., rows) may be stored into the same table and get merged over time by a background merging process of the storage 230.

As the subject matter described herein may involve a highly scalable and distributed system, failures can happen to the real-time injection pipeline between the stream manager 210, the aggregator 225, the storage 230 replica, another element of data processing system 200, or any combination thereof. Such a failure may be described as a processing failure event. In such failure instances, the aggregator 225 may retry sending the data to storage 230. However, resending data may cause data duplication. To avoid data duplication, storage 230 may provide a block-level deduplication mechanism. However, in some approaches facing such situations, it may be difficult to deterministically produce identical blocks by the aggregator 225 from the one or more main streams 215 and avoid data duplication or data loss.

Some existing systems for data storage may not efficiently handle multiple table topic consumption, and may result in data duplication. In some examples, storage 230 may provide a table engine to consume stream manager 210 messages, convert the messages into table rows, and persist the table rows into the destination table. Although such an engine may be configured with multiple topics, a stream manager 210 engine may have a single table schema defined. Therefore, the stream manager 210 engine may be incompatible in some storage 230 deployments that handle messages that belong to multiple tables. In addition, the table engine may support an at-least-once guarantee (e.g., an assurance that data may be delivered at least one time, and possibly more than one time since multiple attempts may be made in efforts to meet the at-least-once guarantee) since it may first load the data to the storage 230 and then may commit an offset back to stream manager 210. If the table engine process were to crash after loading data to storage 230 (e.g., causing a processing failure event) and fails to commit offset back to stream manager 210, data will be loaded to storage 230 by the next engine process, which may cause data duplication.

The use of the aggregator 225 may resolve such data duplication issues. The aggregator 225 may consume the stream manager 210 messages (e.g., from the main stream 215), accumulate the messages into data blocks according to a data block structure and send the blocks to the storage 230. The aggregators 225 of different replicas may retry sending the blocks in case of failures in a way that each message may be part of the same identical block, irrespective of which replica is retrying. In this way, the data processing system 200 may avoid data duplication while preventing data loss in case of failures.

The aggregator 225 or other elements of data processing system 200 may also aid in resolving failures in the data processing system 200. For example, one or more elements of the data processing system 200 may fail and cause a processing failure event. The aggregator 225 or other element of the data processing system 200 may retrieve a metadata instance that may contain information that may or may not have been lost or duplicated as a result of the failure event. For example, if data was lost as a result of the processing failure event, the aggregator 225 may "retry" sending the blocks (e.g., by aggregating multiple messages into data blocks in the same way that was being done around the time of the processing failure event), and the missing data may be stored, thereby avoiding data loss.

In another example, data may have been previously stored, but due to the processing failure event, storage of such data may not have been recognized. For example, in such an event, the aggregator 225 may retrieve the metadata associated with the possibly duplicated data, and aggregate multiple messages into data blocks in the same way that was being done around the time of the processing failure event.

The same data blocks produced by the aggregator 225 then get sent to the storage 230. The storage 230 may detect that the same data blocks have been already stored in the storage 230, and thus discard these duplicated data blocks, thereby avoiding data duplication.

The aggregator 225 may be a process co-located with a storage 230 replica process in a compute node. Additionally or alternatively, the aggregator 225 may be located elsewhere (e.g., in another compute node, on another server, in a cloud platform, etc.). In some examples, both the aggregator 225 and the storage 230 replica may be hosted in two different containers in the same pod. In the aggregator 225, two stream manager 210 connectors may be launched, each of which may subscribe to a topic that belongs to one of the two stream manager 210 clusters (e.g., each in a separate data center as discussed herein). Since the number of the partitions in each topic may be configured to be the same as the number of the replicas, each aggregator 225 may receive balanced loads from the stream manager 210.

The stream manager 210 may transmit messages to the aggregator 225. For example, a client application may publish table rows as messages into a broker (e.g., associated with the stream manager 210), and each table row may be encoded in a format (e.g., a protobuf format) for each message. In some examples, multiple rows may be batched (e.g., for better efficiency). The aggregator 225 may retrieve one or more table schema definitions from the storage 230 replica (e.g., which may be co-located) at a start time. Additionally or alternatively, the aggregator 225 may also retrieve one or more table schema definitions at another time (e.g., whenever a new table is introduced or an existing table's schema is updated). Based on the table schema, the aggregator 225 may dynamically construct a binary row de-serializer to decode the stream manager 210 messages.

Each stream manager 210 connector may consume messages from the stream manager 210 broker (e.g., after subscribing to a topic) via its message consumer. The message consumer may sort the message and may transmit the message to a corresponding partition handler. In some examples, it is possible that a stream manager 210 connector may be assigned with more than one partition when re-partitioning happens, and thus each aggregator 225 may have more than one partition handler accordingly. The partition handler may identify the table name from the stream manager 210 message and may construct the corresponding table de-serializer to reconstruct the rows from the stream manager 210 message.

The aggregator 225 may aggregate the received messages into one or more data blocks. For example, each row inserted may be accumulated into a block such as the block 227 in FIG. 2. For example, rows of messages $Msg_1$, $Msg_2$, and so on until row $Msg_N$ may be aggregated into the block 227, as depicted in FIG. 2. Once the block reaches a threshold (e.g., either its block size reaches the maximum or designated byte size—such as 10 MB—or the lifetime of the block reaches some time limit, such as one second), the block is sealed and a block flushing task may be submitted to a background processing pool. In some examples, the block flushing task may rely on storage 230's native protocol (e.g., a TCP/IP protocol) to insert the block into its corresponding storage 230 replica, and the block may be persisted into storage 230. In some examples, an insert quorum=2 may be used to force two replicas to have the same data copies (e.g., before the block flushing task gets successful acknowledgement).

In some examples, the aggregator 225 may determine and store metadata associated with the data blocks (e.g., before creating the data blocks or before storing the data blocks at the storage 230). For example, one or more offsets of the processed messages and other metadata may be stored or persisted to the stream manager 210's metadata tracking store (e.g., via the metadata stream 220). In some examples, the metadata may be stored or persisted by a partition handler. Further, the metadata tracking store may be, in some examples, a built-in stream manager 210 topic. Such stored information may be used by the aggregator 225 in case of failure (e.g., failure of another aggregator 225 in a distributed system).

In some examples, the metadata may be stored in one or more metadata instances 232 and may include one or more items of information associated with a respective data block (e.g., block 227, the data blocks being transmitted to the storage 230 as depicted in FIG. 2, or both), a table, other information, or any combination thereof. The metadata instance may specify a data block structure indicating information about the messages aggregated by the aggregator 225 into a particular block 227. For example, metadata may be expressed in a structure that may include information such as one or more parameters such as: replica-Id, table-name, begin-msg-offset, end-msg-offset, count, one or more other parameters, or any combination thereof. Such a structure may be referred to as a metadata instance. A metadata instance may describe a collection or group of one or more pieces of metadata that may be associated in some way. Additionally or alternatively, metadata for multiple blocks may be stored according to the approaches described herein may include one or more parameters, such as Metadata.min=MIN (begin-msg-offset), Metadata.max=MAX(end-msg-offset), or any combination thereof.

One example of metadata may be stored as the following: [replica_1, table1, 0, 29, 20, table2, 5, 20, 10]. In this example, the last block for table1 that was loaded was [0, 29]. The starting offset min=0, and 20 messages have been consumed for table1. The last block for table2 that was loaded was [5, 20]. The starting offset min=5, and 10 messages have been consumed for table2. In total, all 30 messages have been consumed from offset min=0 to offset max=29: 20 for table 1 and 10 for table2.

In some examples, a metadata structure may be used for a "special" block, in which a begin-msg-offset=end-msg-offset+1. In such a situation, either no message for the table with offset less than begin-msg-offset or any message for the table with offset less than begin-msg-offset has been received and acknowledged (e.g., by the storage 230 or an associated application). An example metadata structure may appear as replica_id, table1, 30, 29, 20, table2, 5, 20, 10. In such an example, one or more messages with offset less than 30 for table1 may be acknowledged (e.g., by the storage 230 or an associated application).

In some examples, the aggregator 225 may manage message consumption and block insertion (e.g., at the storage 230). By doing so, the data processing system 200 may support features or aspects not offered by other approaches, such as, for example, multiple tables per topic/partition, no data loss/duplication, improved visibility by introducing metrics (e.g., on a large scale, such as one hundred or more metrics) to monitor the stream manager 210 message processing rates, block insertion rates, block insertion failure rates, block size distributions, block loading times, metadata commit time, metadata commit failure rates, whether abnormal message consumption behaviors have happened (e.g., a message offset being re-wound), or any combination thereof.

As explained herein, one role of the aggregator 225 is to consume messages from stream manager 210, form large blocks and load them to storage 230. A naive aggregator 225 that forms blocks without additional measures can potentially cause either data duplication or data loss. For example, consider a simple, naïve aggregator that works as follows: the naïve aggregator consumes messages and adds them to a buffer. Once the buffer reaches a size, the naïve aggregator flushes it to storage 230. After storage 230 acknowledges loading the block, the naïve aggregator may commit one or more offsets thereby marking the position up to which this deficient system is done with processing the messages. Now, consider the scenario where the naïve aggregator fails right after flushing the block to storage and before committing offset to stream manager 210. In this case, another naïve aggregator will re-consume the messages already loaded to storage 230 causing data duplication.

Some improvements may be made to such a naïve aggregator, but may still be problematic. For example, the naïve aggregator may first commit one or more offsets and may further load data storage. In this case, however, data loss may occur if the naïve aggregator crashes after committing offset to stream manager 210 and before flushing the block to storage 230. As such, the approaches of such a naïve aggregator cannot guarantee that data is loaded to storage 230 exactly one time.

However, the aggregator 225 described herein may resolve such problems and increase data integrity and reliability in the data processing system 200. For example, the aggregator 225 may load one or more blocks to storage 230 and commit one or more offsets (e.g., or other metadata) to stream manager 210 (e.g., via the metadata stream 220). Some approaches may do so atomically using an atomic commit protocol (e.g., such as 2-Phase Commit (2PC)). However, 2PC may present costs and complications to guarantee distributed transaction. A typical 2PC requires communication between the coordinator and the participants in two different phases (commit request phase and commit phase), thus introducing additional costs in terms of longer latency for the messages in the stream manager 210 to be loaded as rows in the storage 230. In the data processing system 200, such 2PC participants can include each of the stream manager 210, the aggregator 225, and the storage 230. The 2PC protocol introduces further complication, because the storage 230 and the stream manager 210 are often developed independently and often do not support 2PC protocol at all. Even if each of the storage 230 and the stream manager 210 does support 2PC protocol, the implementation of the 2PC protocol in each of them can be incompatible that the 2PC protocol cannot be correctly enforced across the stream manager 210, the aggregator 225 and the storage 230.

Instead of using an atomic commit protocol the data processing system 200 may employ an approach that may utilize the native block deduplication mechanism offered by the storage 230. For example, storage 230 may deduplicate "identical blocks" (i.e., blocks with the same size, blocks containing the same rows in the same order, or blocks determined to be "identical by one or more other measures). Therefore, if the aggregator 225 employs "retries" in the form of identical blocks, data duplication may be avoided while re-sending data.

The aggregator 225 may form identical blocks in such a manner. For example, the aggregator 225 may transmit metadata back to stream manager 210 (e.g., via the metadata stream 220), and the metadata may describe one or more recent blocks formed for each table. Using this metadata, in case of a failure of the aggregator 225, the next aggregator 225 that picks up the partition may have access to information sufficient to reconstruct the latest blocks formed for each table by the previous aggregator 225. Note that the two aggregators 225 described here can be two different instances (e.g., co-located in two different storage 230 replicas).

The aggregator 225 may operate in two different modes. For example, when the aggregator 225 is assigned a partition to process, it may retrieve the stored metadata from stream manager 210, and may start to consume from the recorded offset. The message consumption may be divided into two phases, a replay phase or mode and a consume phase or mode. The aggregator 225 may first start in the replay mode where it may deterministically reproduce the latest blocks formed by the previous aggregator 225. In some examples, after all of these blocks (e.g., one block for each table) are formed and loaded to storage 230, the aggregator 225 changes to the consume mode where it normally consumes and forms the blocks. In the consume mode, the aggregator 225 may track blocks for each table. For example, the aggregator 225 may, for each table, keep track of the one or more parameters, such as start and end offsets of the messages included in the current buffer for the table. Once a buffer is ready to be flushed to storage 230, the aggregator 225 may commit the metadata to stream manager 210 (e.g., the metadata stream 220), and may further flush the blocks to storage 230. In some such approaches, the data processing system 200 may not flush a block to storage 230 unless the system 200 has recorded an "intention to flush" on stream manager 210. Thus, if the aggregator 225 crashes, the next aggregator 225 will retry to avoid data loss, and since the system 200 has committed the metadata, the next aggregator 225 may have access to information sufficient to form (e.g., re-form) the identical blocks. In some examples, if the previous try by the previous aggregator 225 was indeed successful and blocks were loaded to storage 230, there may not be any data duplication, as storage 230 is guaranteed to de-duplicate the identical blocks.

The metadata generated by the aggregator 225 and stored for later use may include one or more parameters used to recreate the data blocks. For example, the metadata may record the start and end offsets for each table. Thus, in some examples, the metadata may be represented as follows: tablet, start1, end2, table2, start2, end2, etc. In some examples, a minimum offset of a metadata instance may be defined as the minimum of its start offsets. For example, if the system 200 is to store metadata M, the aggregator 225 may commit offset=M.min. In such a case, the stream manager 210 may consider messages with an offset less than M.min as successfully processed. Thus, in case of a failure of a aggregator 225, the next aggregator 225 may start consuming from M.min. In this way, the data processing system 200 may use one or more algorithms to implement this approach for streams of messages destined at different tables.

At various times, the data processing system 200 may employ the use of the aggregator runtime verifier 235 to ensure proper operation of the system 200 (e.g., to avoid data duplication and data loss). For example, the aggregator runtime verifier 235 may perform one or more anomaly storage checks. The aggregator runtime verifier 235 may be a separate program, and, in some examples, may be written in NodeJs (e.g., to implement an anomaly storage check). One role of aggregator runtime verifier 235 is to analyze the history of the system and make sure that there are no anomalies leading to data loss/duplication, referred herein as an anomaly storage check. Since the system 200 commits metadata to stream manager 210, the whole history of the operation of the system 200 is stored (e.g., in an internal stream manager 210 topic, which may be called _consumer_offset). In some examples, the aggregator runtime verifier 235 may subscribe to the _consumer_offset topic (or otherwise retrieve the metadata) and may further analyze the metadata instances committed by the aggregators 225. The aggregator runtime verifier 235 may raise an alert when it detects an anomaly (e.g., the aggregator runtime verifier 235 may transmit a message or indication to the monitoring/alert system 240 for transmission, such as to a user or administrator).

For example, let M.t.start and M.t.end be the start offset and end offset for a table t in metadata instance M, respectively. For example, metadata instances may be referred to as metadata instance i, metadata instance i+1, metadata instance i+2, etc., and may be notated as $M_i$, $M_{i+1}$, $M_{i+2}$, etc. Additionally or alternatively, metadata instances may be denoted by their index in the sequence of the metadata instances stored on the stream manager 210. For example, $M_0$ may be the first metadata instance, $M_1$ may be the second, and so on. The aggregator runtime verifier 235 may search for or identify one or more anomalies for given metadata instances (e.g., $M_i$ and $M_{i+1}$), such as a backward anomaly in which, for some table t, $M_{i+1}$.t.end<$M_i$.t.start. Further, the aggregator runtime verifier 235 may identify an overlap anomaly, in which, for some table t, $M_i$.t.start< $M_{i+1}$.t.end and $M_{1+1}$.t.start<$M_i$.t.end.

In some examples, the data processing system 200 may augment metadata with more information to detect data loss. For example, in addition to the start and end offsets for each table, the data processing system 200 may keep track of the number of messages sent (e.g., M.count) for each table starting from a common reference offset (e.g., M.reference). Such an approach may aid in the detection of additional anomalies, such as gap anomalies in which the number of messages sent in relation to a reference offset is less than the minimum offset present in a table, block, or other grouping of messages. For example, Let M.count be the number of messages consumed for all tables starting from M.reference. The aggregator runtime verifier 235 may identify a gap anomaly in which, M.reference+M.count<M'.min. Such an anomaly may indicate that one or more messages were not processed and may not be properly stored.

In some examples, the aggregator runtime verifier 235 checks the above anomalies for each M and M' where M is right before M' in the sequence of the metadata instances committed (e.g., to the _consumer_offset topic for each partition). For this approach, aggregator runtime verifier 235 may read metadata instances in the order they are committed to stream manager 210. However, a topic such as the _consumer_offset topic may be partitioned topic and the stream manager 210 may not guarantee order across partitions. To solve this issue, metadata instances may be stored to a heap according to their commit timestamp. The data processing system 200 may run the verification periodically by reading and popping the top of the heap. In this approach, however, the clock of the stream manager 210 brokers is synchronized with an uncertainty window less than the time between committing two metadata instances. In other words, the data processing system 200 may not commit metadata to stream manager 210 too frequently. In some examples, the data processing system 200 may commit metadata to stream manager 210 for each block every several seconds, which is infrequent compared to the clock skew and may avoid such an issue.

In some examples, when the aggregator runtime verifier 235 does not find such anomalies, the data processing system 200 may therefore be free of duplication due to block formation. However, for data loss, the data processing system 200 may periodically flush one or more blocks that have been accumulated. At these forced flush points, the aggregator 225 may flush one or more buffers that have accumulated (e.g., disregarding size or lifetime) and may reset the reference. Once this is performed, the data processing system 200 may be free of gap anomalies, which may mean that there is no data loss.

The aggregator runtime verifier 235 may continuously monitor one or more blocks that the aggregator 225 may form and load to storage 230 as explained herein. In this way, data integrity and reliability may be improved.

In some examples, the data processing system 200 may be applied to various scenarios, including an online marketplace scenario. For example, the stream manager 210 may transmit messages that may originate from an online marketplace, and may contain information about the marketplace, such as seller information, seller statistics, sales information, metrics, upcoming tasks, service metrics, peer benchmarks, previously listed items, traffic information, indications of listings that are under-performing, on track or over performing, listing impressions, conversion rates, other information associated with an online marketplace, or any combination thereof. The data processing system 200 may receive such information that may be organized into various topics as described herein. Thus, for example, the stream manager 210 may provide such messages that include online marketplace information to the aggregator 225, which may parse the messages and create metadata to be transmitted (e.g., via the metadata stream 220 to a metadata store) and retrieved at a later data in case of failures (e.g., in accordance with the examples provided herein). Further, the aggregator 225 may form the data blocks with the online marketplace information, and may transmit such blocks to the storage 230, so that a user may access the data blocks at a later time (e.g., to view or analyze the stored online marketplace information). In this way, the data processing system 200 may offer increased performance and reliability for online marketplace data that may be critical to the operation of a seller on the online marketplace and whose loss may negatively impact the seller's operations.

Figure 3:
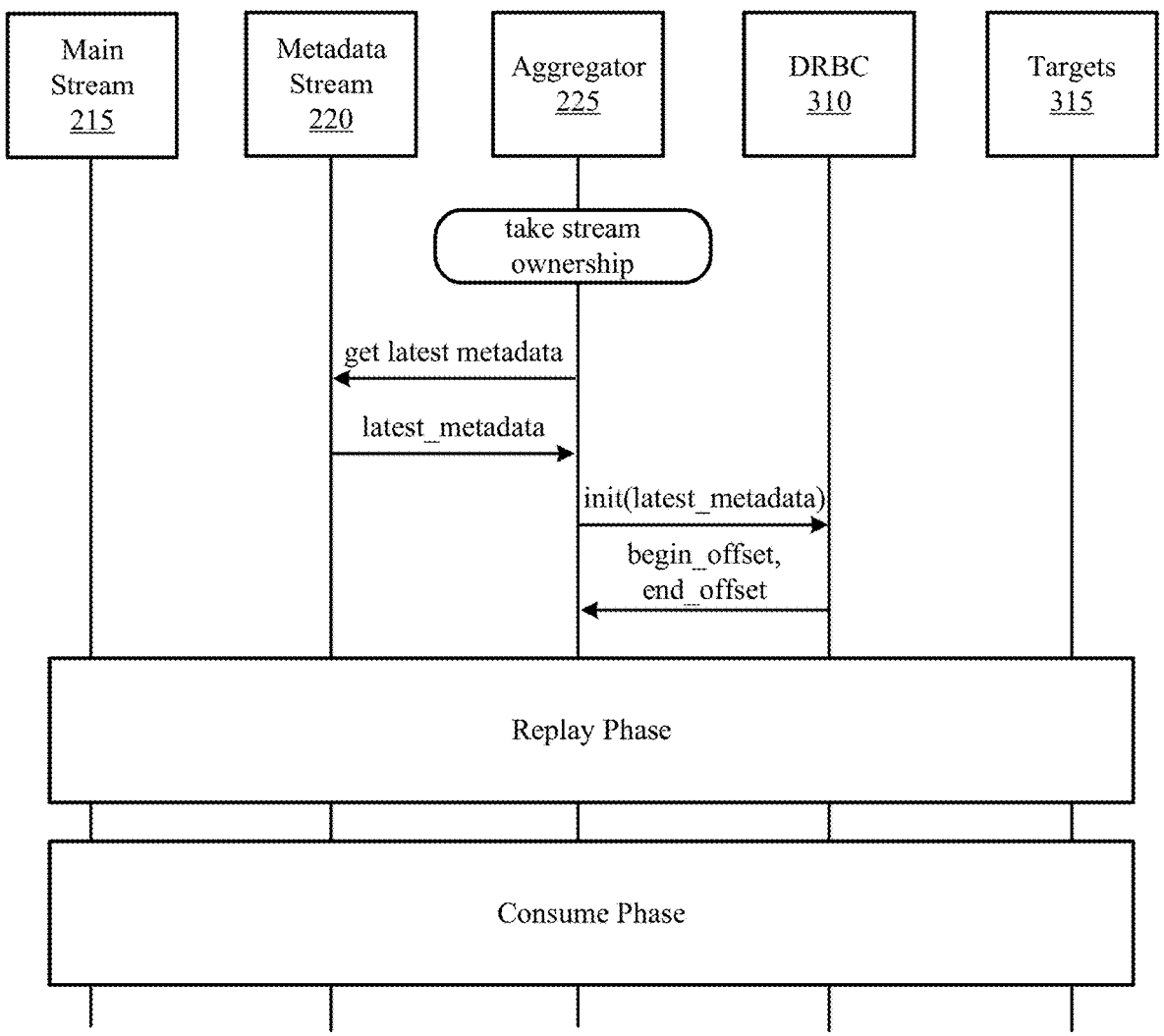
FIG. 3 illustrates an example of a process flow that supports block aggregation for shared streams in accordance with examples as disclosed herein.

FIG. 3 illustrates an example of a process flow 300 that supports block aggregation for shared streams in accordance with examples as disclosed herein. The process flow 300 may include the main stream 215, the metadata stream 220, the aggregator 225, a deterministic records to blocks converter (DRBC), such as the DRBC 310, and the targets 315.

In some examples, a target 315 may be described using one or more parameters, functions, or both. For example, a target may be described in relation to a data structure as follows:

struct Target {
        int begin //begin offset for the last block constructed for the target
        int end //end offset of the last block constructed for the target
        int count //number of records consumed for the target
    }

In some examples, metadata (e.g., associated with the metadata stream 220) may be described using one or more parameters, functions, or both. For example, a metadata structure may be described in relation to a data structure as follows:

struct Metadata {
        int reference //the offset from where we started counting records for the targets

```
Map<string, Target> targets //map of target name to
    Target structure defined above
min ( ) {
    return min of begin of targets
}
max ( ) {
    return max of end of targets
}
allCheckedOffset ( ) {
    return the sum of count of all targets+reference
}
}
```

In some examples, a record as described herein may be described using one or more parameters, functions, or both. For example, a metadata structure may be described in relation to a data structure as follows:

```
struct Record {
    string target //the name of target this record belongs to
    int offset //the offset of this record in the stream
    bytes data //the data this record carries
}
```

In some examples, a block or data block as described herein may be described using one or more parameters, functions, or both. For example, a block or data block may be described in relation to a data structure as follows:

```
struct Block {
    int time //time of the last time we send a block to a
        target
    int count //number of records in the block
    bytes payload //the payload included in the block to be
        delivered to the target
    append(Record record) {
        add record.data to payload
        count++
    }
}
```

In the process flow 300 the aggregator 225 may take ownership of a stream (e.g., a stream of messages). Once the aggregator 225 does so, it may request and receive one or more instances of metadata (e.g., on a metadata stream). Further, the aggregator 225 may initialize an instance of the DRBC 310 (e.g., using the received one or more metadata instances). In some examples, the DRBC 310 may use, process, or otherwise be associated with the data structures described herein, including a target data structure, a metadata data structure, a record data structure, and a block data structure. In some examples, the DRBC 310 itself may include or be associated with a data structure, such as the following data structure:

```
struct DRBC {
    Map<string, Block> blocks //map of target name to the block being
    constructed for the target
    Metadata cur_metadata //metadata instance keeping track of the
    blocks being constructed
    Metadata pre_metadata //metadata committed to the metadata
    stream by the previous Aggregator
    int last //the offset the latest record added to the DRBC
    init (Metadata metadata){
        pre_metadata = metadata
        cur_metadata.reference = metadata.reference
        return {metadata.min( ), metadata.max( )}
    }
    addRecord (Record record){
        last = record.offset
        if (cur_metadata.reference == -1)
            cur_metadata.reference = record.offset
```

```
        if (record.offset > pre_metadata.max( )) {
            blocks[record.target].append (record)
        } else {
            if (record.offset >= pre_metadata.targets[record.target].begin) {
                blocks[record.target].append (record)
                if (record.offset ==
                    pre_metadata.targets[record.target].end) {
                    blocks[record.target].count = 0
                    blocks [record.target].time =
                    current_system_time
                    return blocks[record.target]
                }
            }
        }
    }
    getBlocks(type) {
        return_blocks = { }
        for (block in blocks){
            if ((type == ALL) ||
                (type == READY && (block.size > size_threshold ||
                current_system_time - block.time > time_threashold))){
                return_blocks.add(block)
                block.count = 0
                block.time = current_system_time
                if (block is empty){
                    cur_metadata.targets[block.target].begin = last +
                    1
                    cur_metadata.targets[block.target].end = last
                } else {
                    cur_metadata.targets[target].begin = block.begin
                    cur_metadata.targets[target].end = block.end
                    cur_metadata.targets[target].count +=
                    block.count
                }
            }
        }
        if (type == ALL) cur_metadata.reference = -1
        return {return_blocks, cur_metadata}
    }
}
```

The aggregator 225 may receive information from the DRBC 310, such as a begin_offset parameter, an end_offset parameter, or both. The aggregator 225 may then proceed to operate in a replay phase, a consume phase, or both. For example, the aggregator 225 may first operate in a replay phase (e.g., as described in relation to FIG. 4), and then in a consume phase (e.g., as described in relation to FIG. 5).

Figure 4:
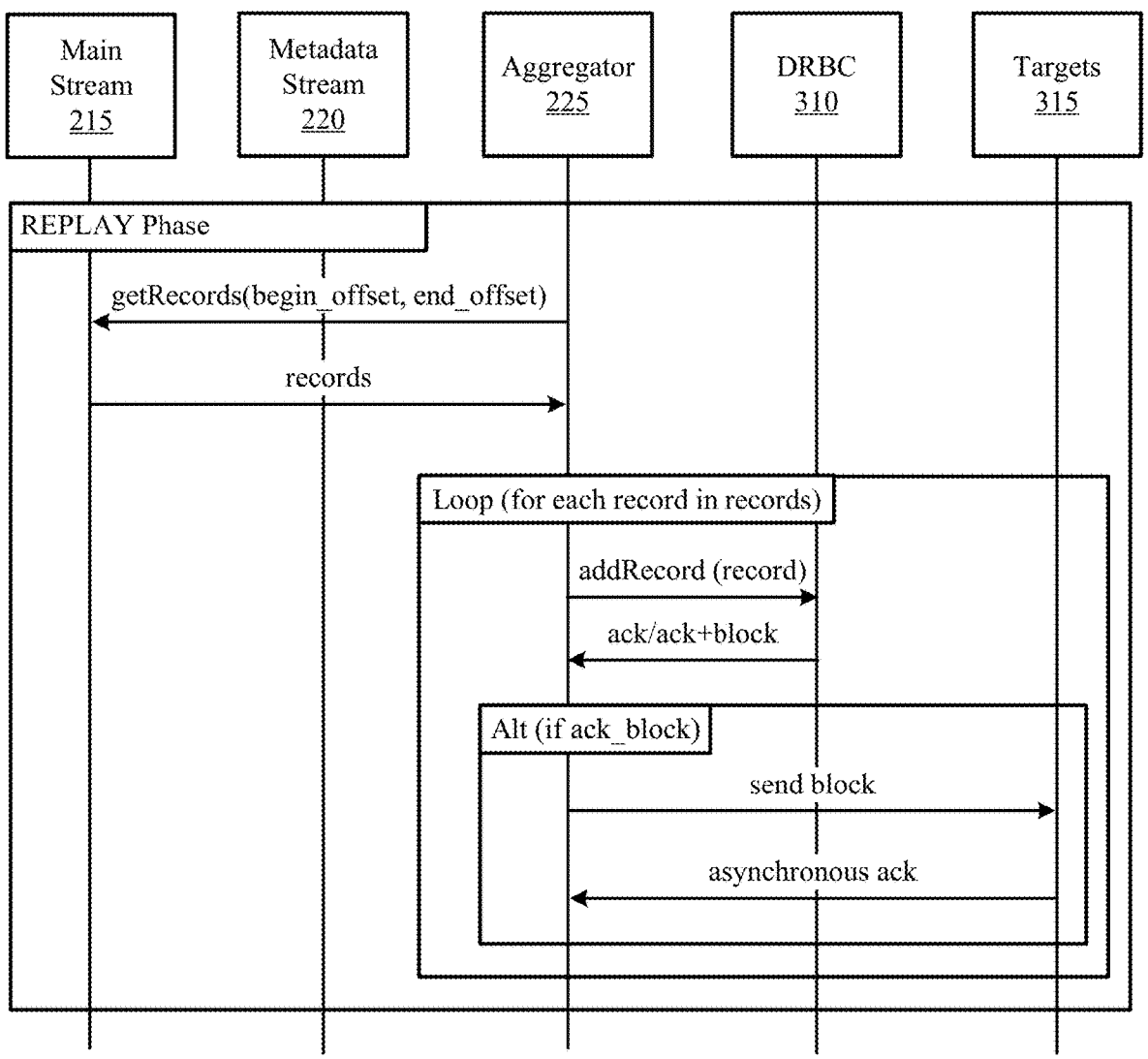
FIG. 4 illustrates an example of a process flow that supports block aggregation for shared streams in accordance with examples as disclosed herein.

FIG. 4 illustrates an example of a process flow 400 that supports block aggregation for shared streams in accordance with examples as disclosed herein. The process flow 400 may include the main stream 215, the metadata stream 220, the aggregator 225, the DRBC 310, and the one or more targets 315 (e.g., one or more databases). The process flow 400 may illustrate a deterministic block construction protocol replay phase.

In the process flow 400, the aggregator 225 may retrieve and read one or more records (e.g., records 217 as depicted in FIG. 2) from the main stream 215 (e.g., with an offset in the range of begin_offset and end_offset) specified by the DRBC 310. A record may identify a table, an offset, and include a payload that includes one or more messages. After adding each record to its corresponding block for aggregation, if the block (e.g., block 227) is reproduced, the aggregator 225 sends the aggregated block (e.g., block 227) to one or more targets 315 (e.g., one or more databases). In some examples, the aggregator 225 may receive an acknowledgement from the target 315 indicating successfully receipt of the aggregated block.

Figure 5:
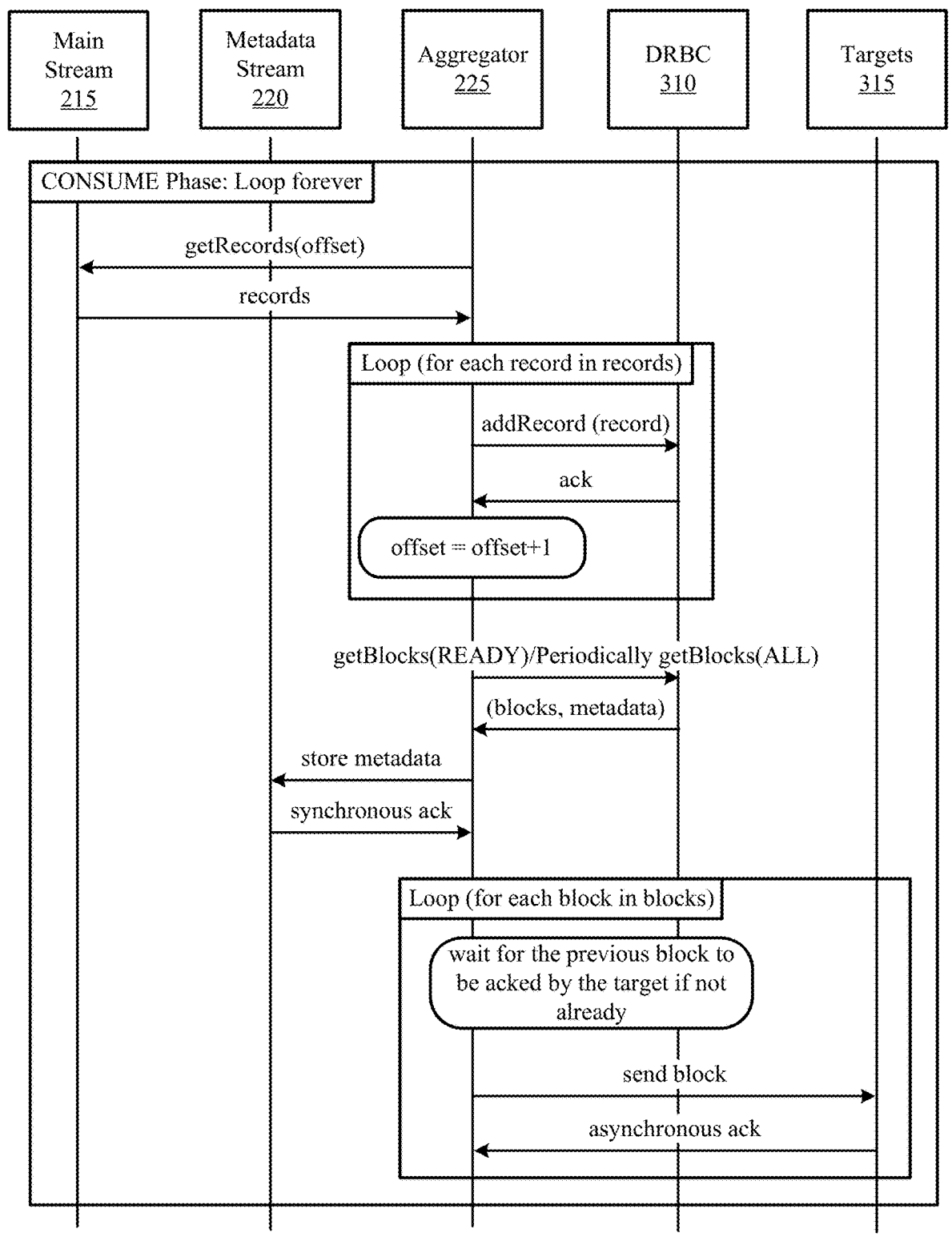
FIG. 5 illustrates an example of a process flow that supports block aggregation for shared streams in accordance with examples as disclosed herein.

FIG. 5 illustrates an example of a process flow 500 that supports block aggregation for shared streams in accordance with examples as disclosed herein. The process flow 500 may include the main stream 215, the metadata stream 220, the aggregator 225, a deterministic records to blocks converter (DRBC), such as the DRBC 310, and the targets 315. The process flow 500 may illustrate a deterministic block construction protocol consume phase.

In the process flow 500, the aggregator 225 continues to read records from the stream as soon as they are available. After consuming a batch of messages, the aggregator 225 checks if there are any blocks ready to be sent to the targets 315. If there is such a block, the aggregator 225 may first commit the metadata returned by the DRBC 310 to the metadata stream 220. For each block ready to be sent, if the aggregator 225 has already sent a block to its target, the aggregator 225 may first wait to receive the acknowledgement. It then sends the new block.

Figure 6:
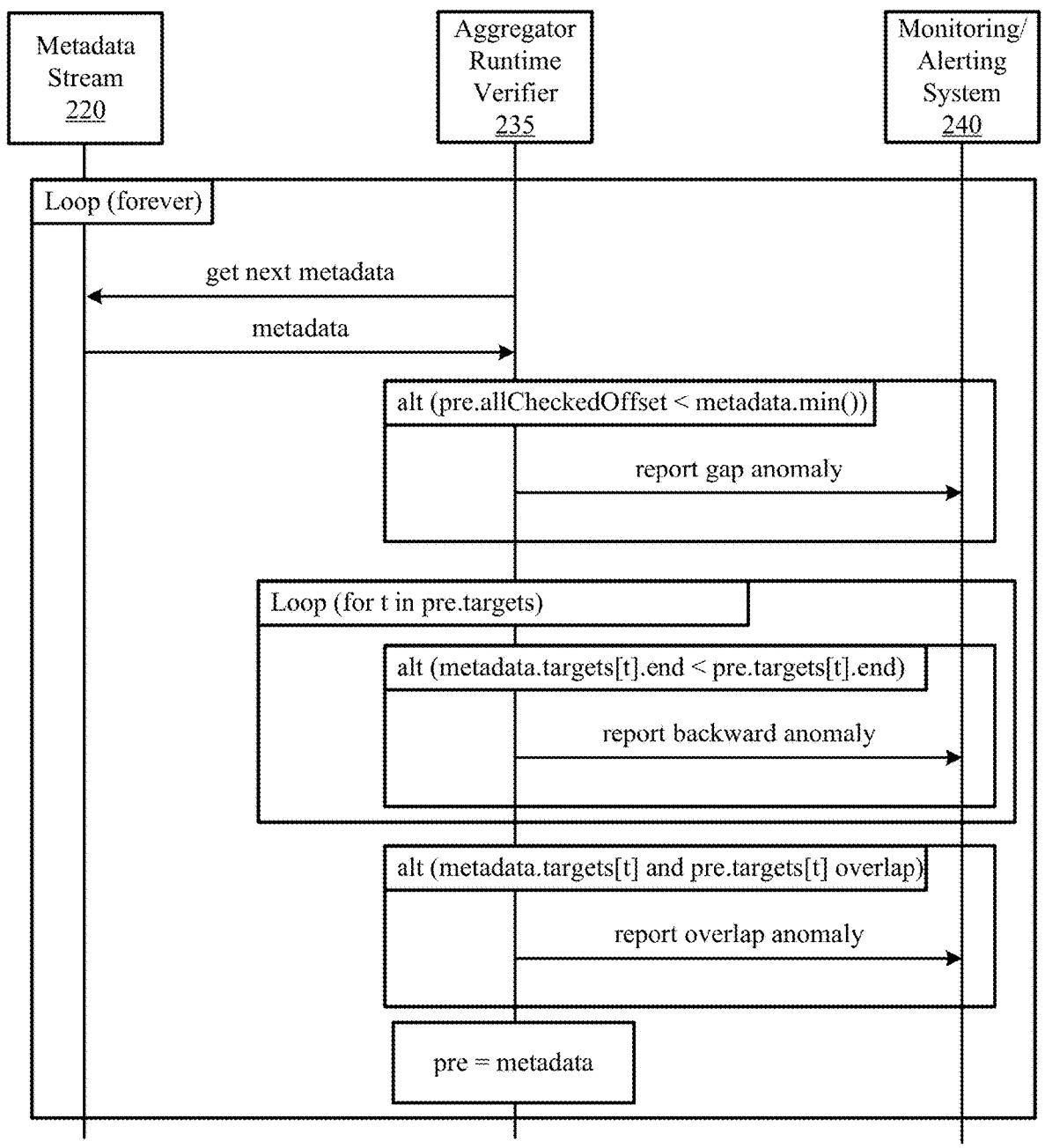
FIG. 6 illustrates an example of a process flow that supports block aggregation for shared streams in accordance with examples as disclosed herein.

FIG. 6 illustrates an example of a process flow 600 that supports block aggregation for shared streams in accordance with examples as disclosed herein. The process flow 600 may include the metadata stream 220, the aggregator runtime verifier 235, and the monitoring/alert system 240. The aggregator runtime verifier 235 may read (e.g., at one or more regular or irregular intervals) metadata instances from the metadata stream 220. For each instance, the aggregator runtime verifier 235 checks for one or more anomalies, such as a backward anomaly, a gap anomaly, or an overlap anomaly, as described herein. If it finds an anomaly it reports the anomaly identified to the monitoring/alerting system.

Figure 7:
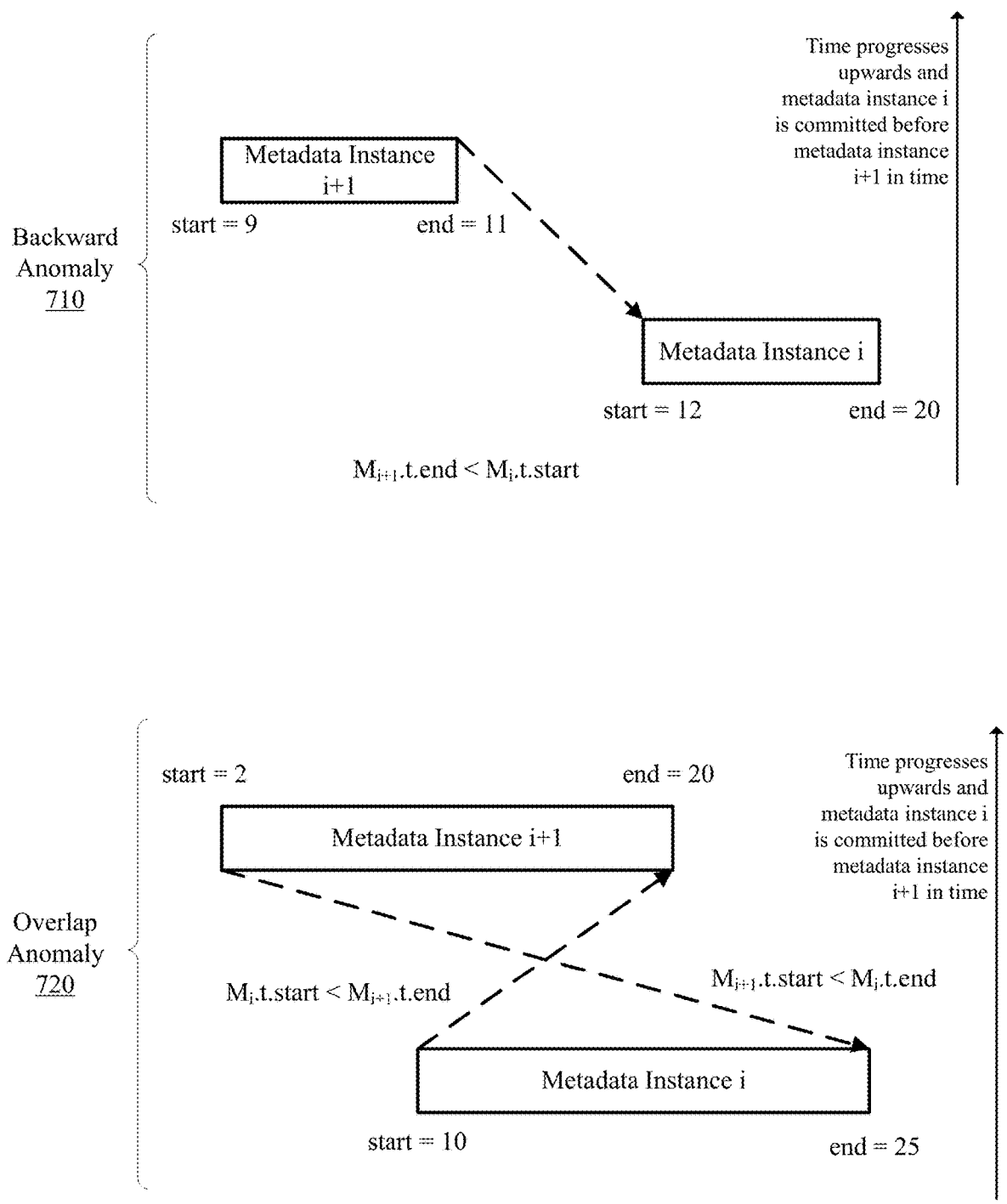
FIG. 7 illustrates an example of a data storage anomaly scenario that supports block aggregation for shared streams in accordance with examples as disclosed herein.

FIG. 7 illustrates an example of a data storage anomaly scenario 700 that supports block aggregation for shared streams in accordance with examples as disclosed herein. The data storage anomaly scenario may include an example of a backward anomaly 710 and an example of an overlap anomaly 720. Each of the backward anomaly 710 and the overlap anomaly 720 may include a first metadata instance i and a second metadata instance i+1. The metadata instance i may be stored, generated, accessed, or otherwise processed in time before the metadata instance i+1. Further, in each of the examples, let $M_i$.t.start and $M_i$.t.end be the start offset and end offset for a table t in metadata instance i, respectively, and $M_{i+1}$.t.start and $M_{i+1}$.t.end be the start offset and end offset for the table tin metadata instance i+1, respectively.

In the course of processing in accordance with aspects of the subject matter discussed herein, metadata instances (e.g., $M_i$ and $M_{i+1}$) are created in a sequential manner (e.g., in a sequence in which one or more records or messages were received and processed by the aggregator 225). These metadata instances may describe or define which messages are in which aggregated block (e.g., block 227). The ranges of messages listed in consecutive metadata instances should line up (e.g., where an ending message identified in a prior metadata instance should be the same as the beginning messages in a following metadata instance). Given the sequential nature of the information stored in the metadata instances, it becomes possible to detect or determine data loss and data duplication in multiple ways, including by detecting or determining the presence of the backward anomaly 710, the overlap anomaly 720, a gap anomaly, or other anomalies.

In the backward anomaly 710, for some table t, $M_{i+1}$.end<$M_i$.t.start. In other words, the end offset of a second metadata instance (e.g., $M_{i+1}$) is less than the start offset of a first metadata instance (e.g., $M_i$). Additionally or alternatively, a backward anomaly may be described as a situation in which an end offset of a metadata instance is less than the start offset of a previous metadata instance. As shown in FIG. 7, the end offset of metadata instance i+1 is 11, and the start offset of metadata instance i is 12, resulting in the backward anomaly 710.

In the overlap anomaly 720, for some table t, $M_i$.t.start<$M_i$.t.end and $M_{i+1}$i.t.start<$M_i$.t.end. In other words, at least some portion of metadata instance i and metadata instance i+1 overlap, and these two comparisons indicate that such an overlap exists, resulting in the overlap anomaly.

Figure 8:
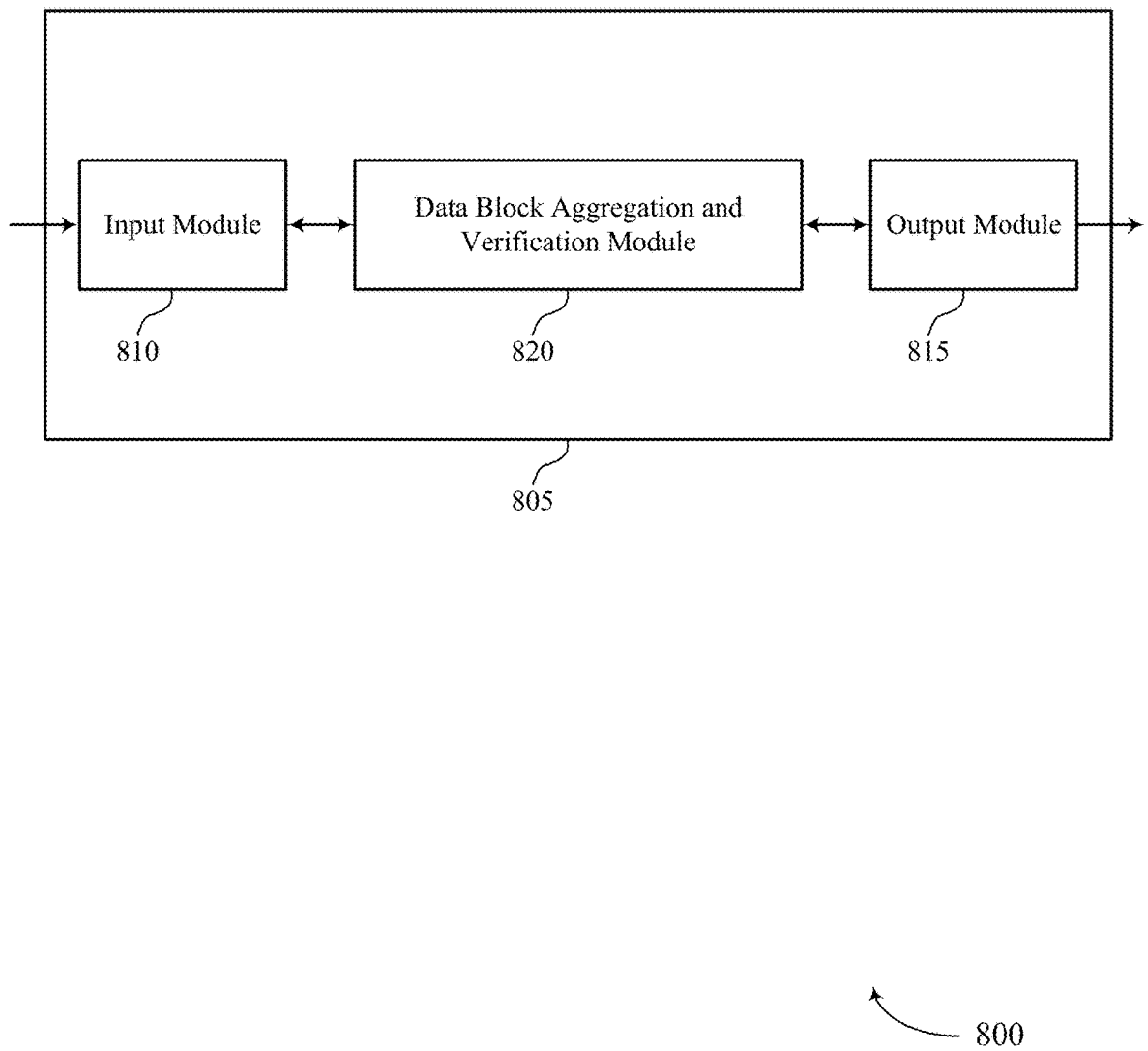
FIGS. 8 and 9 show block diagrams of devices that support block aggregation for shared streams in accordance with examples as disclosed herein.

FIG. 8 shows a block diagram 800 of a device 805 that supports block aggregation for shared streams in accordance with examples as disclosed herein. The device 805 may be an example of aspects of a data processing system as described herein. The device 805 may include an input module 810, an output module 815, and a data block aggregation and verification module 820. The device 805 may also include a processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the data block aggregation and verification module 820 to support block aggregation for shared streams. In some cases, the input module 810 may be a component of an I/O controller 1110 as described with reference to FIG. 11.

The output module 815 may manage output signals for the device 805. For example, the output module 815 may receive signals from other components of the device 805, such as the data block aggregation and verification module 820, and may transmit these signals to other components or devices. In some examples, the output module 815 may transmit output signals for display in a user interface, for storage in a database or data store, for further processing at a server or server cluster, or for any other processes at any number of devices or systems. In some cases, the output module 815 may be a component of an I/O controller 1110 as described with reference to FIG. 11.

The data block aggregation and verification module 820, the input module 810, the output module 815, or various combinations thereof or various components thereof may be examples of means for performing various aspects of block aggregation for shared streams as described herein. For example, the data block aggregation and verification module 820, the input module 810, the output module 815, or various combinations or components thereof may support a method for performing one or more of the functions described herein.

In some examples, the data block aggregation and verification module 820, the input module 810, the output module 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the data block aggregation and verification module 820, the input module 810, the output module 815, or various combinations or components thereof may be implemented in code (e.g., as communications management software or firmware) executed by a processor. If implemented in code executed by a processor, the functions of the data block aggregation and verification module 820, the input module 810, the output module 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the data block aggregation and verification module 820 may be configured to perform various operations (e.g., receiving, monitoring, transmitting) using or otherwise in cooperation with the input module 810, the output module 815, or both. For example, the data block aggregation and verification module 820 may receive information from the input module 810, send information to the output module 815, or be integrated in combination with the input module 810, the output module 815, or both to receive information, transmit information, or perform various other operations as described herein.

The data block aggregation and verification module 820 may support data processing in accordance with examples as disclosed herein. For example, the data block aggregation and verification module 820 may be configured as or otherwise support a means for loading, by at least one processor, a plurality of metadata instances for a plurality of data blocks storing in a database, each metadata instance of the plurality of metadata instances indicating a respective data block structure applied to aggregate a set of data messages by a respective data block of the plurality of data blocks. The data block aggregation and verification module 820 may be configured as or otherwise support a means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The data block aggregation and verification module 820 may be configured as or otherwise support a means for generating an output based at least in part on the anomaly storage check.

By including or configuring the data block aggregation and verification module 820 in accordance with examples as described herein, the device 805 (e.g., a processor controlling or otherwise coupled to the input module 810, the output module 815, the data block aggregation and verification module 820, or a combination thereof) may support techniques for reduced processing, reduced power consumption, more efficient utilization of communication resources, or a combination thereof.

Figure 9:
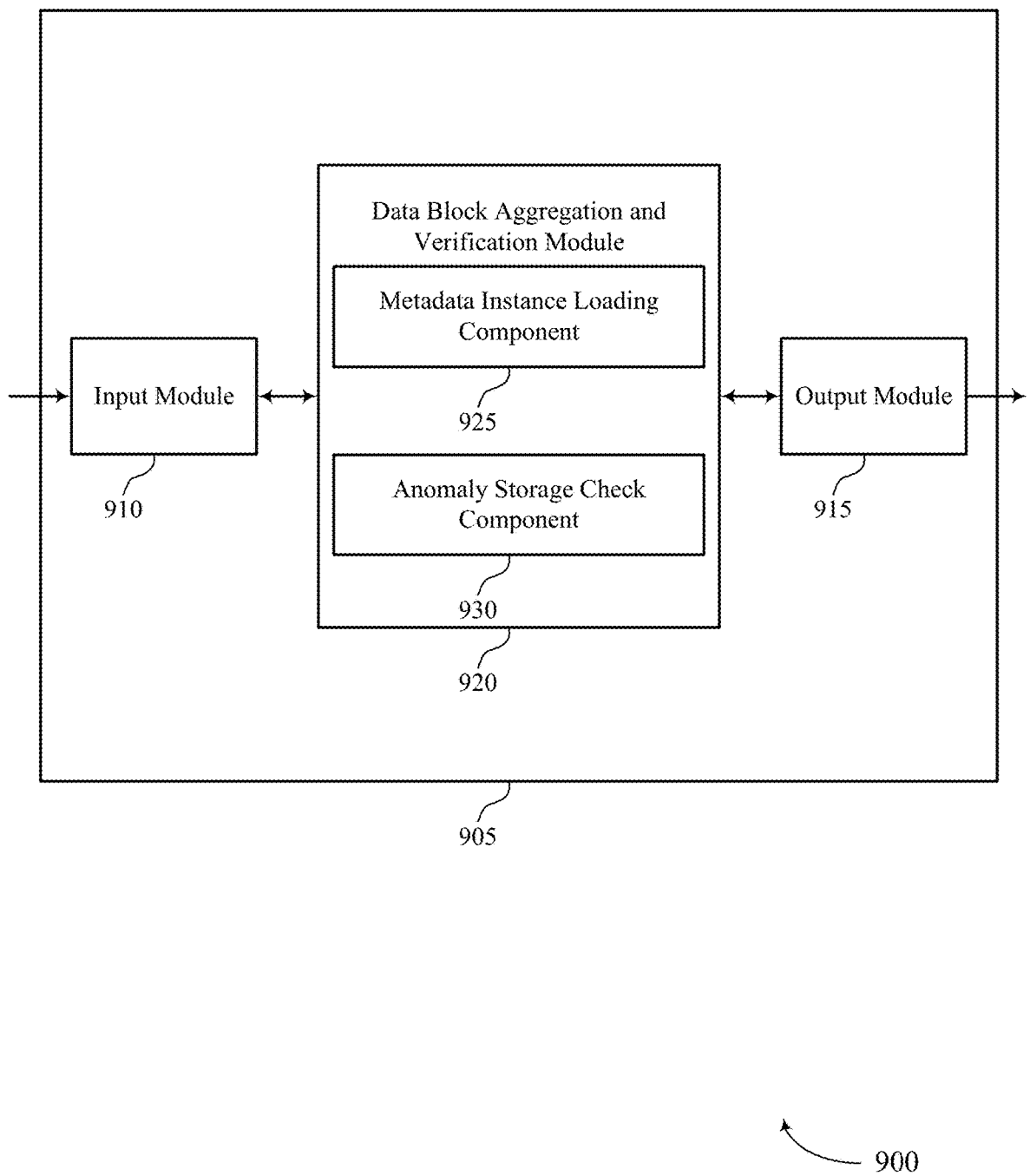

FIG. 9 shows a block diagram 900 of a device 905 that supports block aggregation for shared streams in accordance with examples as disclosed herein. The device 905 may be an example of aspects of a device 805 or a data processing system as described herein. The device 905 may include an input module 910, an output module 915, and a data block aggregation and verification module 920. The device 905 may also include a processor. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the data block aggregation and verification module 920 to support block aggregation for shared streams. In some cases, the input module 910 may be a component of an I/O controller 1110 as described with reference to FIG. 11.

The output module 915 may manage output signals for the device 905. For example, the output module 915 may receive signals from other components of the device 905, such as the data block aggregation and verification module 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110 as described with reference to FIG. 11.

The device 905, or various components thereof, may be an example of means for performing various aspects of block aggregation for shared streams as described herein. For example, the data block aggregation and verification module 920 may include a metadata instance loading component 925 an anomaly storage check component 930, or any combination thereof. The data block aggregation and verification module 920 may be an example of aspects of a data block aggregation and verification module 820 as described herein. In some examples, the data block aggregation and verification module 920, or various components thereof, may be configured to perform various operations (e.g., receiving, monitoring, transmitting) using or otherwise in cooperation with the input module 910, the output module 915, or both. For example, the data block aggregation and verification module 920 may receive information from the input module 910, send information to the output module 915, or be integrated in combination with the input module 910, the output module 915, or both to receive information, transmit information, or perform various other operations as described herein.

The data block aggregation and verification module 920 may support data processing in accordance with examples as disclosed herein. The metadata instance loading component 925 may be configured as or otherwise support a means for loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The anomaly storage check component 930 may be configured as or otherwise support a means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The anomaly storage check component 930 may be configured as or otherwise support a means for generating an output based at least in part on the anomaly storage check.

Figure 10:
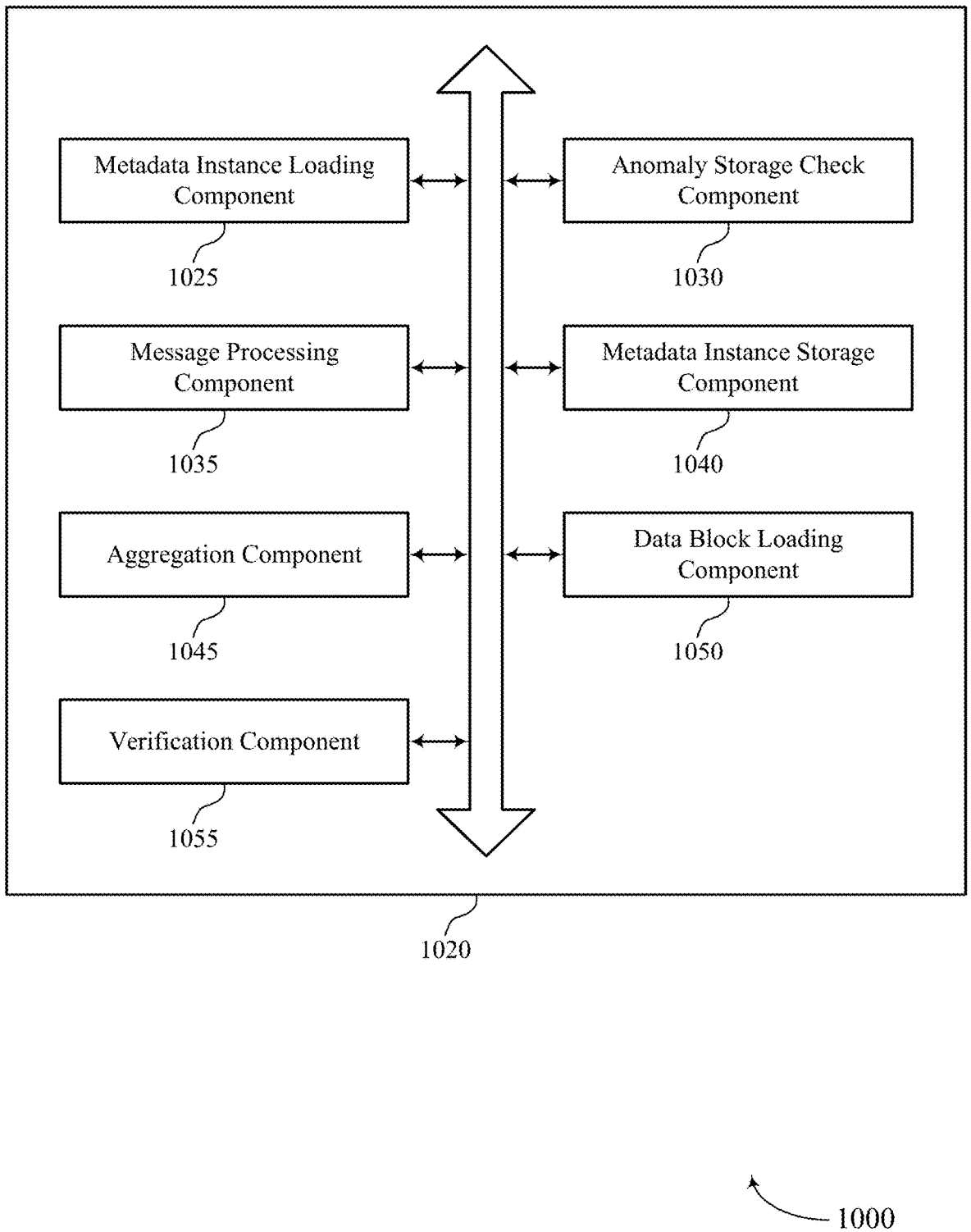
FIG. 10 shows a block diagram of a data block aggregation and verification module that supports block aggregation for shared streams in accordance with examples as disclosed herein.

FIG. 10 shows a block diagram 1000 of a data block aggregation and verification module 1020 that supports block aggregation for shared streams in accordance with examples as disclosed herein. The data block aggregation and verification module 1020 may be an example of aspects of a data block aggregation and verification module 820, a data block aggregation and verification module 920, or both, as described herein. The data block aggregation and verification module 1020, or various components thereof, may be an example of means for performing various aspects of block aggregation for shared streams as described herein. For example, the data block aggregation and verification module 1020 may include a metadata instance loading component 1025, an anomaly storage check component 1030, a message processing component 1035, a metadata instance storage component 1040, an aggregation component 1045, a data block loading component 1050, a verification component 1055, or any combination thereof. Each of these components may communicate, directly or indirectly, with one another (e.g., via one or more buses).

The data block aggregation and verification module 1020 may support data processing in accordance with examples as disclosed herein. The metadata instance loading component 1025 may be configured as or otherwise support a means for loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The anomaly storage check component 1030 may be configured as or otherwise support a means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. In some examples, the anomaly storage check component 1030 may be configured as or otherwise support a means for generating an output based at least in part on the anomaly storage check.

In some examples, to support processing, the anomaly storage check component 1030 may be configured as or otherwise support a means for detecting a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks.

In some examples, to support processing, the anomaly storage check component 1030 may be configured as or otherwise support a means for detecting an overlap anomaly based at least in part on the first metadata instance and the second metadata instance indicating that a range of data messages aggregated in the first set of one or more data blocks at least partially overlaps with a range of data messages aggregated in the second set of one or more data blocks.

In some examples, to support generating the output, the anomaly storage check component 1030 may be configured as or otherwise support a means for transmitting a message that indicates an anomaly is detected or is not detected.

In some examples, each of the first set of one or more data blocks and the second set of one or more data blocks corresponds to a same table stored in the database.

In some examples, the message processing component 1035 may be configured as or otherwise support a means for receiving, from a data processing pipeline, a first plurality of messages to be stored in the database. In some examples, the metadata instance storage component 1040 may be configured as or otherwise support a means for storing the first metadata instance indicating a first data block structure applied to aggregate the first plurality of messages into the first set of one or more data blocks, each data block of the first set of one or more data blocks being associated with a respective table of a plurality of tables stored in the database. In some examples, the aggregation component 1045 may be configured as or otherwise support a means for aggregating, by an aggregator, the first plurality of messages into the first set of one or more data blocks in accordance with the first data block structure. In some examples, the data block loading component 1050 may be configured as or otherwise support a means for loading, in the database, the first set of one or more data blocks in the plurality of tables.

In some examples, the verification component 1055 may be configured as or otherwise support a means for detecting a processing failure event corresponding to the data processing pipeline, the aggregator, the database, or any combination thereof. In some examples, the metadata instance loading component 1025 may be configured as or otherwise support a means for retrieving a third metadata instance indicating a second data block structure and a second plurality of messages indicated by the second metadata instance. In some examples, the aggregation component 1045 may be configured as or otherwise support a means for aggregating the second plurality of messages into a second plurality of data blocks in accordance with the second data block structure. In some examples, the data block loading component 1050 may be configured as or otherwise support a means for loading, in the database, the second plurality of data blocks in the plurality of tables.

In some examples, the verification component 1055 may be configured as or otherwise support a means for detecting a processing failure event corresponding to the data processing pipeline, the aggregator, the database, or any combination thereof. In some examples, the metadata instance loading component 1025 may be configured as or otherwise support a means for retrieving a third metadata instance indicating a second data block structure and a second plurality of messages indicated by the second metadata instance. In some examples, the data block loading component 1050 may be configured as or otherwise support a means for determining that a second plurality of data blocks was previously stored by the database in the plurality of tables based at least in part on the third metadata instance.

In some examples, the metadata instance storage component 1040 may be configured as or otherwise support a means for storing the plurality of metadata instances in memory separate from the database prior to loading the first set of one or more data blocks in the database.

In some examples, the first metadata instance indicates a first data block structure identifying a minimum message offset and a maximum message offset for a plurality of messages aggregated in the first set of one or more data blocks corresponding to a first table of the database.

In some examples, the first metadata instance indicates a first data block structure identifying a minimum message offset and a maximum message offset for a plurality of messages aggregated in the first set of one or more data blocks corresponding to multiple tables of the database.

Figure 11:
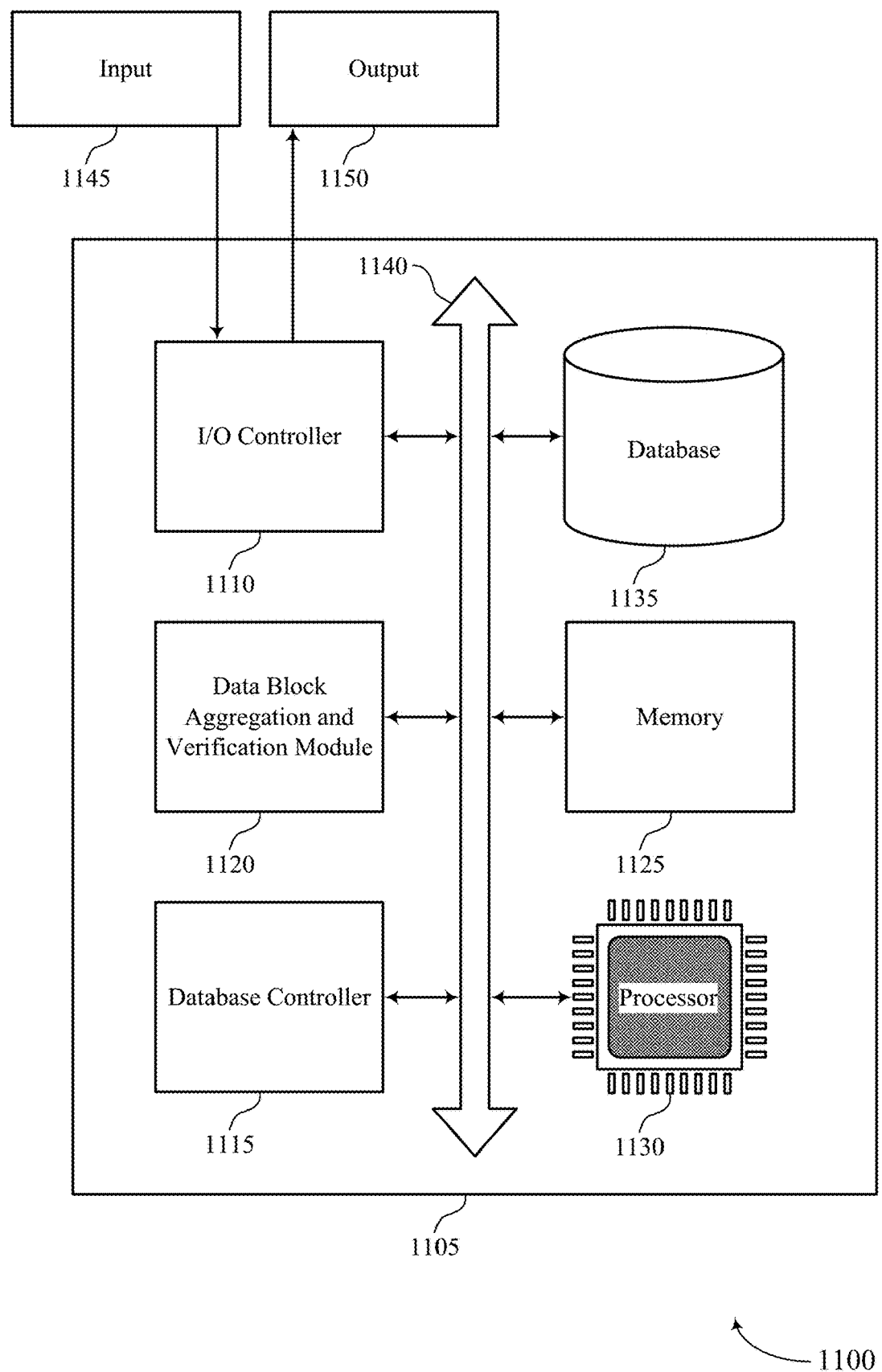
FIG. 11 shows a diagram of a system including a device that supports block aggregation for shared streams in accordance with examples as disclosed herein.

FIG. 11 shows a diagram of a system 1100 including a device 1105 that supports block aggregation for shared streams in accordance with examples as disclosed herein. The device 1105 may be an example of or include the components of a device 805, a device 905, or an application server as described herein. The device 1105 may include components for bi-directional data communications including components for transmitting and receiving communications, such as a data block aggregation and verification module 1120, an I/O controller 1110, a database controller 1115, a memory 1125, a processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and ROM. The memory 1125 may store computer-readable, computer-executable software including instructions that, when executed, cause the processor 1130 to perform various functions described herein. In some cases, the memory 1125 may contain, among other things, a BIOS which may control basic hardware or software operation such as the interaction with peripheral components or devices.

The processor 1130 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting block aggregation for shared streams).

The data block aggregation and verification module 1120 may support data processing in accordance with examples as disclosed herein. For example, the data block aggregation and verification module 1120 may be configured as or otherwise support a means for loading, by at least one processor, a plurality of metadata instances for a plurality of data blocks storing in a database, each metadata instance of the plurality of metadata instances indicating a respective data block structure applied to aggregate a set of data messages by a respective data block of the plurality of data blocks. The data block aggregation and verification module 1120 may be configured as or otherwise support a means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The data block aggregation and verification module 1120 may be configured as or otherwise support a means for generating an output based at least in part on the anomaly storage check.

By including or configuring the data block aggregation and verification module 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

Figure 12:
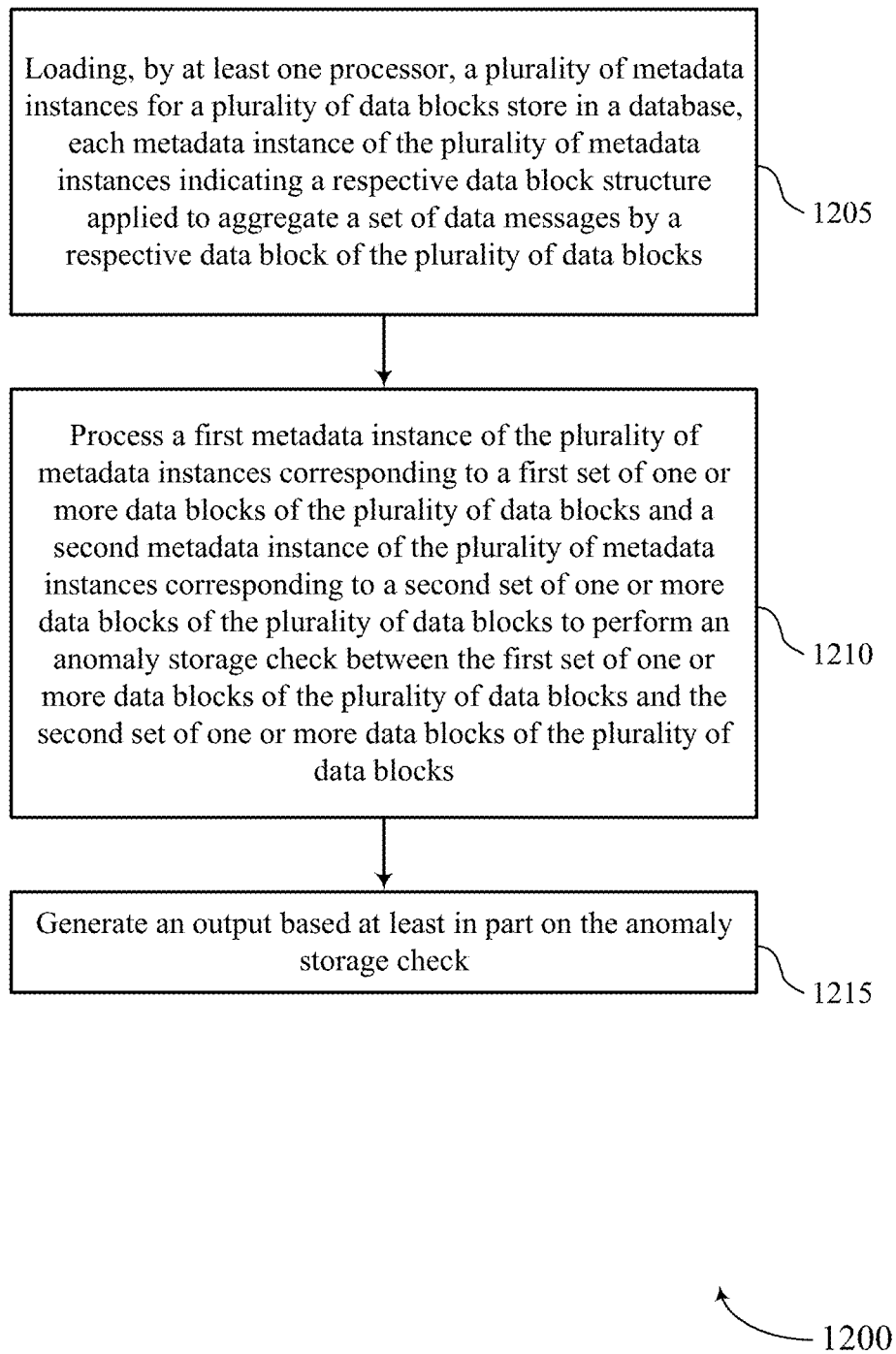
FIGS. 12 through 15 show flowcharts illustrating methods that support block aggregation for shared streams in accordance with examples as disclosed herein.

FIG. 12 shows a flowchart illustrating a method 1200 that supports block aggregation for shared streams in accordance with examples as disclosed herein. The operations of the method 1200 may be implemented by an application server or its components as described herein. For example, the operations of the method 1200 may be performed by an application server as described with reference to FIG. 1 through 11. In some examples, an application server may execute a set of instructions to control the functional elements of the application server to perform the described functions. Additionally or alternatively, the application server may perform aspects of the described functions using special-purpose hardware.

At 1205, the method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The operations of 1205 may be performed in accordance with examples as disclosed herein. In some examples, aspects of the operations of 1205 may be performed by a metadata instance loading component 1025 as described with reference to FIG. 10.

At 1210, the method may include processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The operations of 1210 may be performed in accordance with examples as disclosed herein. In some examples, aspects of the operations of 1210 may be performed by an anomaly storage check component 1030 as described with reference to FIG. 10.

At 1215, the method may include generating an output based at least in part on the anomaly storage check. The operations of 1215 may be performed in accordance with examples as disclosed herein. In some examples, aspects of the operations of 1215 may be performed by an anomaly storage check component 1030 as described with reference to FIG. 10.

Figure 13:
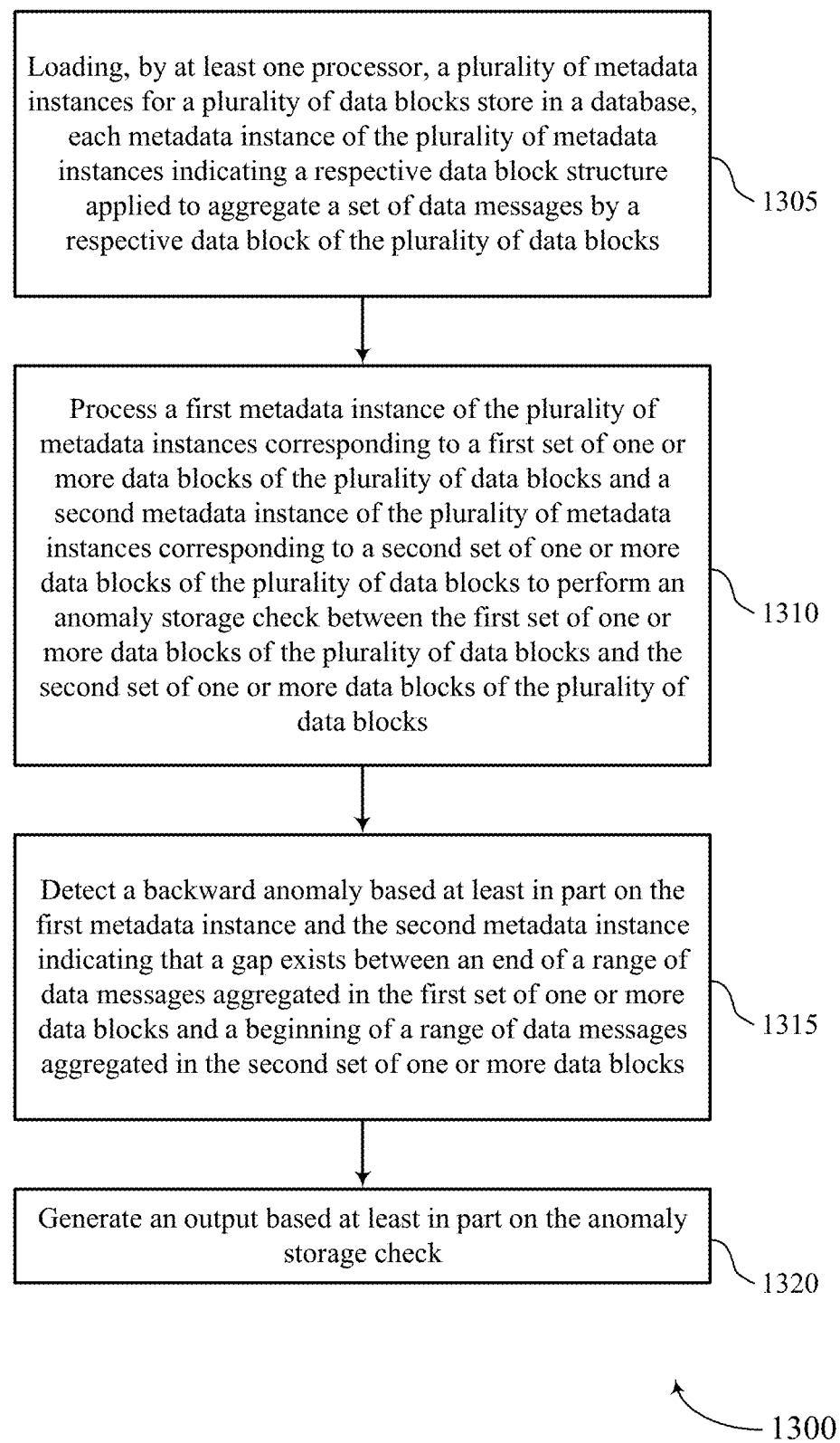

FIG. 13 shows a flowchart illustrating a method 1300 that supports block aggregation for shared streams in accordance with examples as disclosed herein. The operations of the method 1300 may be implemented by an application server or its components as described herein. For example, the operations of the method 1300 may be performed by an application server as described with reference to FIG. 1 through 11. In some examples, an application server may execute a set of instructions to control the functional elements of the application server to perform the described functions. Additionally or alternatively, the application server may perform aspects of the described functions using special-purpose hardware.

At 1305, the method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The operations of 1305 may be performed in accordance with examples as disclosed herein. In some examples, aspects of the operations of 1305 may be performed by a metadata instance loading component 1025 as described with reference to FIG. 10.

At 1310, the method may include processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The operations of 1310 may be performed in accordance with examples as disclosed herein. In some examples, aspects of the operations of 1310 may be performed by an anomaly storage check component 1030 as described with reference to FIG. 10.

At 1315, the method may include detecting a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks. The operations of 1315 may be performed in accordance with examples as disclosed herein. In some examples, aspects of the operations of 1315 may be performed by an anomaly storage check component 1030 as described with reference to FIG. 10.

At 1320, the method may include generating an output based at least in part on the anomaly storage check. The operations of 1320 may be performed in accordance with examples as disclosed herein. In some examples, aspects of the operations of 1320 may be performed by an anomaly storage check component 1030 as described with reference to FIG. 10.

Figure 14:
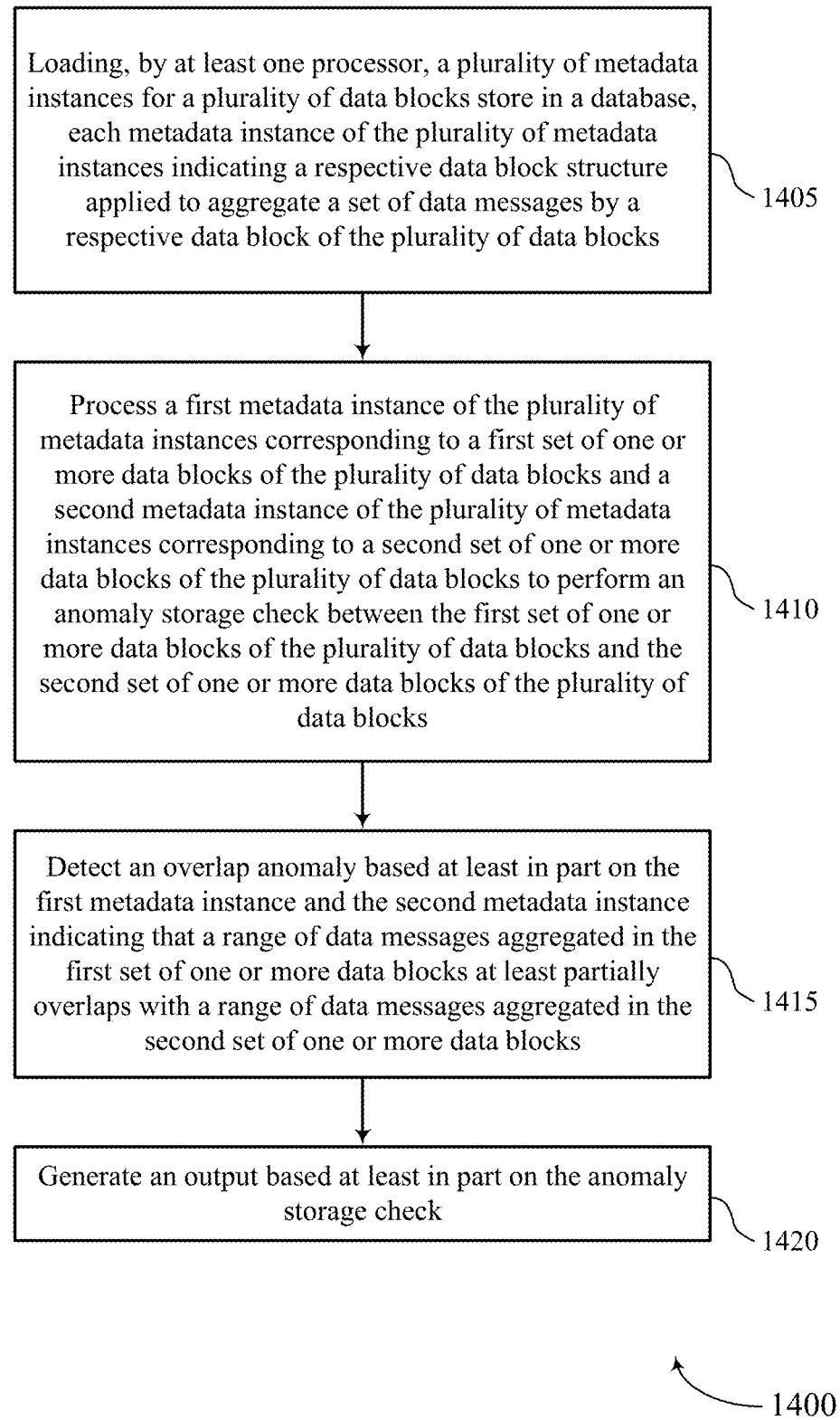

FIG. 14 shows a flowchart illustrating a method 1400 that supports block aggregation for shared streams in accordance with examples as disclosed herein. The operations of the method 1400 may be implemented by an application server or its components as described herein. For example, the operations of the method 1400 may be performed by an application server as described with reference to FIG. 1 through 11. In some examples, an application server may execute a set of instructions to control the functional elements of the application server to perform the described functions. Additionally or alternatively, the application server may perform aspects of the described functions using special-purpose hardware.

At 1405, the method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The operations of 1405 may be performed in accordance with examples as disclosed herein. In some examples, aspects of the operations of 1405 may be performed by a metadata instance loading component 1025 as described with reference to FIG. 10.

At 1410, the method may include processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The operations of 1410 may be performed in accordance with examples as disclosed herein. In some examples, aspects of the operations of 1410 may be performed by an anomaly storage check component 1030 as described with reference to FIG. 10.

At 1415, the method may include detecting an overlap anomaly based at least in part on the first metadata instance and the second metadata instance indicating that a range of data messages aggregated in the first set of one or more data blocks at least partially overlaps with a range of data messages aggregated in the second set of one or more data blocks. The operations of 1415 may be performed in accordance with examples as disclosed herein. In some examples, aspects of the operations of 1415 may be performed by an anomaly storage check component 1030 as described with reference to FIG. 10.

At 1420, the method may include generating an output based at least in part on the anomaly storage check. The operations of 1420 may be performed in accordance with examples as disclosed herein. In some examples, aspects of the operations of 1420 may be performed by an anomaly storage check component 1030 as described with reference to FIG. 10.

Figure 15:
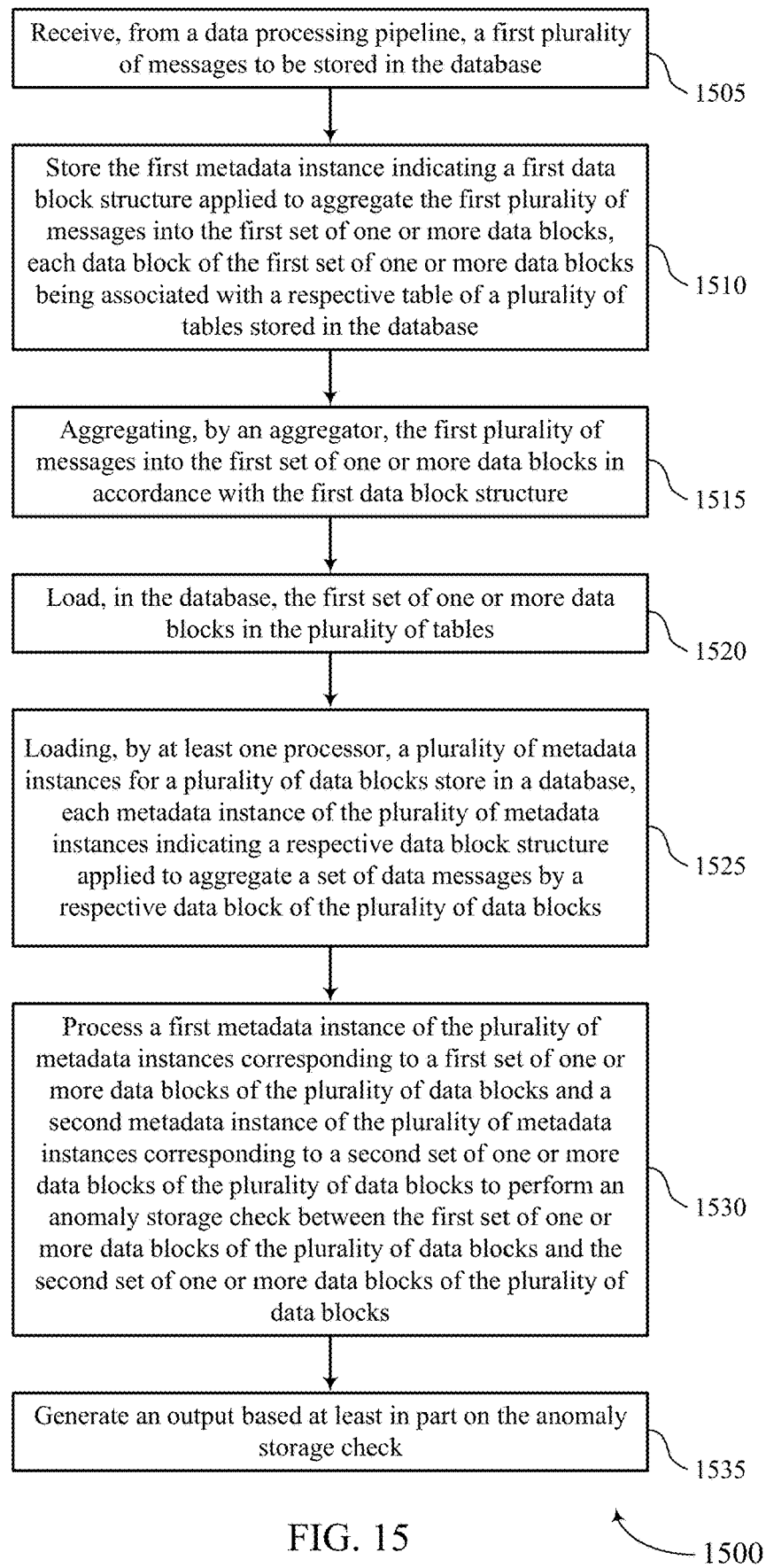

FIG. 15 shows a flowchart illustrating a method 1500 that supports block aggregation for shared streams in accordance with examples as disclosed herein. The operations of the method 1500 may be implemented by an application server or its components as described herein. For example, the operations of the method 1500 may be performed by an application server as described with reference to FIG. 1 through 11. In some examples, an application server may execute a set of instructions to control the functional elements of the application server to perform the described functions. Additionally or alternatively, the application server may perform aspects of the described functions using special-purpose hardware.

At 1505, the method may include receiving, from a data processing pipeline, a first plurality of messages to be stored in the database. The operations of 1505 may be performed in accordance with examples as disclosed herein. In some examples, aspects of the operations of 1505 may be performed by a message processing component 1035 as described with reference to FIG. 10.

At 1510, the method may include storing the first metadata instance indicating a first data block structure applied to aggregate the first plurality of messages into the first set of one or more data blocks, each data block of the first set of one or more data blocks being associated with a respective table of a plurality of tables stored in the database. The operations of 1510 may be performed in accordance with examples as disclosed herein. In some examples, aspects of the operations of 1510 may be performed by a metadata instance storage component 1040 as described with reference to FIG. 10.

At 1515, the method may include aggregating, by an aggregator, the first plurality of messages into the first set of one or more data blocks in accordance with the first data block structure. The operations of 1515 may be performed in accordance with examples as disclosed herein. In some examples, aspects of the operations of 1515 may be performed by an aggregation component 1045 as described with reference to FIG. 10.

At 1520, the method may include loading, in the database, the first set of one or more data blocks in the plurality of tables. The operations of 1520 may be performed in accordance with examples as disclosed herein. In some examples, aspects of the operations of 1520 may be performed by a data block loading component 1050 as described with reference to FIG. 10.

At 1525, the method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks. The operations of 1525 may be performed in accordance with examples as disclosed herein. In some examples, aspects of the operations of 1525 may be performed by a metadata instance loading component 1025 as described with reference to FIG. 10.

At 1530, the method may include processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks. The operations of 1530 may be performed in accordance with examples as disclosed herein. In some examples, aspects of the operations of 1530 may be performed by an anomaly storage check component 1030 as described with reference to FIG. 10.

At 1535, the method may include generating an output based at least in part on the anomaly storage check. The operations of 1535 may be performed in accordance with examples as disclosed herein. In some examples, aspects of the operations of 1535 may be performed by an anomaly storage check component 1030 as described with reference to FIG. 10.

A method for data processing is described. The method may include loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generating an output based at least in part on the anomaly storage check.

An apparatus for data processing is described. The apparatus may include a processor, memory coupled with the processor, and instructions stored in the memory. The instructions may be executable by the processor to cause the apparatus to loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, process a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generate an output based at least in part on the anomaly storage check.

Another apparatus for data processing is described. The apparatus may include means for loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, means for processing a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and means for generating an output based at least in part on the anomaly storage check.

A non-transitory computer-readable medium storing code for data processing is described. The code may include instructions executable by a processor to loading, by at least one processor, a plurality of metadata instances for a plurality of data blocks stored in a database, each metadata instance of the plurality of metadata instances indicating a respective data block structure applied to aggregate a set of data messages by a respective data block of the plurality of data blocks, process a first metadata instance of the plurality of metadata instances corresponding to a first set of one or more data blocks of the plurality of data blocks and a second metadata instance of the plurality of metadata instances corresponding to a second set of one or more data blocks of the plurality of data blocks to perform an anomaly storage check between the first set of one or more data blocks of the plurality of data blocks and the second set of one or more data blocks of the plurality of data blocks, and generate an output based at least in part on the anomaly storage check.

In some examples of the method, apparatuses, and non-transitory computer-readable medium described herein, the processing may include operations, features, means, or instructions for detecting a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks.

In some examples of the method, apparatuses, and non-transitory computer-readable medium described herein, the processing may include operations, features, means, or instructions for detecting an overlap anomaly based at least in part on the first metadata instance and the second metadata instance indicating that a range of data messages aggregated in the first set of one or more data blocks at least partially overlaps with a range of data messages aggregated in the second set of one or more data blocks.

In some examples of the method, apparatuses, and non-transitory computer-readable medium described herein, generating the output may include operations, features, means, or instructions for transmitting a message that indicates an anomaly may be detected or may be not detected.

In some examples of the method, apparatuses, and non-transitory computer-readable medium described herein, each of the first set of one or more data blocks and the second set of one or more data blocks corresponds to a same table stored in the database.

Some examples of the method, apparatuses, and non-transitory computer-readable medium described herein may further include operations, features, means, or instructions for receiving, from a data processing pipeline, a first plurality of messages to be stored in the database, storing the first metadata instance indicating a first data block structure applied to aggregate the first plurality of messages into the first set of one or more data blocks, each data block of the first set of one or more data blocks being associated with a respective table of a plurality of tables stored in the database, aggregating, by an aggregator, the first plurality of messages into the first set of one or more data blocks in accordance with the first data block structure, and loading, in the database, the first set of one or more data blocks in the plurality of tables.

Some examples of the method, apparatuses, and non-transitory computer-readable medium described herein may further include operations, features, means, or instructions for detecting a processing failure event corresponding to the data processing pipeline, the aggregator, the database, or any combination thereof, retrieving a third metadata instance indicating a second data block structure and a second plurality of messages indicated by the second metadata instance, aggregating the second plurality of messages into a second plurality of data blocks in accordance with the second data block structure, and loading, in the database, the second plurality of data blocks in the plurality of tables.

Some examples of the method, apparatuses, and non-transitory computer-readable medium described herein may further include operations, features, means, or instructions for detecting a processing failure event corresponding to the data processing pipeline, the aggregator, the database, or any combination thereof, retrieving a third metadata instance indicating a second data block structure and a second plurality of messages indicated by the second metadata instance, and determining that a second plurality of data blocks was previously stored by the database in the plurality of tables based at least in part on the third metadata instance.

Some examples of the method, apparatuses, and non-transitory computer-readable medium described herein may further include operations, features, means, or instructions for storing the plurality of metadata instances in memory separate from the database prior to loading the first set of one or more data blocks in the database.

In some examples of the method, apparatuses, and non-transitory computer-readable medium described herein, the first metadata instance indicates a first data block structure identifying a minimum message offset and a maximum message offset for a plurality of messages aggregated in the first set of one or more data blocks corresponding to a first table of the database.

In some examples of the method, apparatuses, and non-transitory computer-readable medium described herein, the first metadata instance indicates a first data block structure identifying a minimum message offset and a maximum message offset for a plurality of messages aggregated in the first set of one or more data blocks corresponding to multiple tables of the database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A computer-implemented method for data processing, comprising:
    loading, by at least one processor, a plurality of metadata instances for a plurality of data blocks stored in a database, each metadata instance having a minimum offset, each metadata instance of the plurality of metadata instances indicating a respective data block structure applied to aggregate a set of data messages by a respective data block of the plurality of data blocks;
    augmenting metadata instances of the plurality of metadata instances with a reference offset;
    processing a first metadata instance of the augmented metadata instances corresponding to a first set of one or more data blocks of the plurality of data blocks and a second metadata instance of the augmented metadata instances corresponding to a second set of one or more data blocks of the plurality of data blocks to perform an anomaly storage check between the first set of one or more data blocks of the plurality of data blocks and the second set of one or more data blocks of the plurality of data blocks where the anomaly storage check is performed by comparing the reference offset and a number of messages processed after the reference offset with the minimum offset; and
    generating an output based at least in part on the anomaly storage check.

2. The method of claim 1, wherein the processing further comprises detecting a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks.

3. The method of claim 1, wherein the processing further comprises detecting an overlap anomaly based at least in part on the first metadata instance and the second metadata instance indicating that a range of data messages aggregated in the first set of one or more data blocks at least partially overlaps with a range of data messages aggregated in the second set of one or more data blocks.

4. The method of claim 1, wherein generating the output comprises transmitting a message that indicates an anomaly is detected or is not detected.

5. The method of claim 1, wherein each of the first set of one or more data blocks and the second set of one or more data blocks corresponds to a same table stored in the database.

6. The method of claim 1, further comprising:
    receiving, from a data processing pipeline, a first plurality of messages to be stored in the database;
    storing the first metadata instance indicating a first data block structure applied to aggregate the first plurality of messages into the first set of one or more data blocks, each data block of the first set of one or more data blocks being associated with a respective table of a plurality of tables stored in the database;

aggregating, by an aggregator, the first plurality of messages into the first set of one or more data blocks in accordance with the first data block structure; and loading, in the database, the first set of one or more data blocks in the plurality of tables.

7. The method of claim 6, further comprising:

detecting a processing failure event corresponding to the data processing pipeline, the aggregator, the database, or any combination thereof;

retrieving a third metadata instance indicating a corresponding data block structure and a second plurality of messages indicated by the second metadata instance in response to detecting the processing failure event;

aggregating the second plurality of messages into a second plurality of data blocks in accordance with the second data block structure; and loading, in the database, the second plurality of data blocks in the plurality of tables.

8. The method of claim 6, further comprising:

detecting a processing failure event corresponding to the data processing pipeline, the aggregator, the database, or any combination thereof;

retrieving a third metadata instance indicating a corresponding data block structure and a second plurality of messages indicated by the second metadata instance in response to detecting the processing failure event; and determining that a second plurality of data blocks was previously stored by the database in the plurality of tables based at least in part on the third metadata instance.

9. The method of claim 6, further comprising storing the plurality of metadata instances in memory separate from the database prior to loading the first set of one or more data blocks in the database.

10. The method of claim 1, wherein the first metadata instance indicates a first data block structure identifying a minimum message offset and a maximum message offset for a plurality of messages aggregated in the first set of one or more data blocks corresponding to a first table of the database.

11. The method of claim 1, wherein the first metadata instance indicates a first data block structure identifying a minimum message offset and a maximum message offset for a plurality of messages aggregated in the first set of one or more data blocks corresponding to multiple tables of the database.

12. An apparatus for data processing, comprising:

a processor;

memory coupled with the processor; and instructions stored in the memory and executable by the processor to cause the apparatus to:

load, by at least one processor, a plurality of metadata instances for a plurality of data blocks stored in a database, each metadata instance having a minimum offset, each metadata instance of the plurality of metadata instances indicating a respective data block structure applied to aggregate a set of data messages by a respective data block of the plurality of data blocks;

augment metadata instances of the plurality of metadata instances with a reference offset;

process a first metadata instance of the augmented metadata instances corresponding to a first set of one or more data blocks of the plurality of data blocks and a second metadata instance of the augmented metadata instances corresponding to a second set of one or more data blocks of the plurality of data blocks to perform an anomaly storage check between the first set of one or more data blocks of the plurality of data blocks and the second set of one or more data blocks of the plurality of data blocks where the anomaly storage check is performed by comparing the reference offset and a number of messages processed after the reference offset with the minimum offset; and generate an output based at least in part on the anomaly storage check.

13. The apparatus of claim 12, wherein the instructions to process are further executable by the processor to cause the apparatus to detect a backward anomaly based at least in part on the first metadata instance and the second metadata instance indicating that a gap exists between an end of a range of data messages aggregated in the first set of one or more data blocks and a beginning of a range of data messages aggregated in the second set of one or more data blocks.

14. The apparatus of claim 12, wherein the instructions to process are further executable by the processor to cause the apparatus to detect an overlap anomaly based at least in part on the first metadata instance and the second metadata instance indicating that a range of data messages aggregated in the first set of one or more data blocks at least partially overlaps with a range of data messages aggregated in the second set of one or more data blocks.

15. The apparatus of claim 12, wherein the instructions are further executable by the processor to cause the apparatus to:

receive, from a data processing pipeline, a first plurality of messages to be stored in the database;

store the first metadata instance indicating a first data block structure applied to aggregate the first plurality of messages into the first set of one or more data blocks, each data block of the first set of one or more data blocks being associated with a respective table of a plurality of tables stored in the database;

aggregate, by an aggregator, the first plurality of messages into the first set of one or more data blocks in accordance with the first data block structure; and load, in the database, the first set of one or more data blocks in the plurality of tables.

16. The apparatus of claim 15, wherein the instructions are further executable by the processor to cause the apparatus to:

detect a processing failure event corresponding to the data processing pipeline, the aggregator, the database, or any combination thereof;

retrieve a third metadata instance indicating a corresponding data block structure and a second plurality of messages indicated by the second metadata instance in response to detecting the processing failure event;

aggregate the second plurality of messages into a second plurality of data blocks in accordance with the second data block structure; and load, in the database, the second plurality of data blocks in the plurality of tables.

17. The apparatus of claim 15, wherein the instructions are further executable by the processor to cause the apparatus to:

detect a processing failure event corresponding to the data processing pipeline, the aggregator, the database, or any combination thereof;

retrieve a third metadata instance indicating a corresponding data block structure and a second plurality of messages indicated by the second metadata instance in response to detecting the processing failure event; and determine that a second plurality of data blocks was previously stored by the database in the plurality of tables based at least in part on the third metadata instance.

18. The apparatus of claim 12, wherein the first metadata instance indicates a first data block structure identifying a minimum message offset and a maximum message offset for a plurality of messages aggregated in the first set of one or more data blocks corresponding to a first table of the database.

19. The apparatus of claim 12, wherein the first metadata instance indicates a first data block structure identifying a minimum message offset and a maximum message offset for a plurality of messages aggregated in the first set of one or more data blocks corresponding to multiple tables of the database.

20. A non-transitory computer-readable medium storing code for data processing, the code comprising instructions executable by a processor to:

load, by at least one processor, a plurality of metadata instances for a plurality of data blocks stored in a database, each metadata instance having a minimum offset, each metadata instance of the plurality of metadata instances indicating a respective data block structure applied to aggregate a set of data messages by a respective data block of the plurality of data blocks;

augment metadata instances of the plurality of metadata instances with a reference offset;

process a first metadata instance of the augmented metadata instances corresponding to a first set of one or more data blocks of the plurality of data blocks and a second metadata instance of the augmented metadata instances corresponding to a second set of one or more data blocks of the plurality of data blocks to perform an anomaly storage check between the first set of one or more data blocks of the plurality of data blocks and the second set of one or more data blocks of the plurality of data blocks where the anomaly storage check is performed by comparing the reference offset and a number of messages processed after the reference offset with the minimum offset; and generate an output based at least in part on the anomaly storage check.

* * * * *